US011153658B2

(12) United States Patent
Li et al.

(10) Patent No.: US 11,153,658 B2
(45) Date of Patent: Oct. 19, 2021

(54) IMAGE DISPLAY METHOD AND GENERATING METHOD, DEVICE, STORAGE MEDIUM AND ELECTRONIC DEVICE

(71) Applicant: Tencent Technology (Shenzhen) Company Limited, Shenzhen (CN)

(72) Inventors: Chaowei Li, Shenzhen (CN); Xiuming Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/987,220

(22) Filed: Aug. 6, 2020

(65) Prior Publication Data
US 2020/0404383 A1 Dec. 24, 2020

Related U.S. Application Data

(63) Continuation of application No. PCT/CN2019/081012, filed on Apr. 2, 2019.

(30) Foreign Application Priority Data

May 11, 2018 (CN) .......................... 201810449296.3

(51) Int. Cl.
H04N 21/472 (2011.01)
H04N 21/6587 (2011.01)
H04N 21/845 (2011.01)

(52) U.S. Cl.
CPC ... H04N 21/47217 (2013.01); H04N 21/6587 (2013.01); H04N 21/8456 (2013.01)

(58) Field of Classification Search
CPC ......... H04N 21/47217; H04N 21/6587; H04N 21/8456; H04N 21/8153; H04N 21/4312; H04N 21/4325; H04N 21/8455
See application file for complete search history.

(56) References Cited

U.S. PATENT DOCUMENTS

2010/0303440 A1 12/2010 Lin et al.
2012/0070129 A1* 3/2012 Lin .................. H04N 21/47202
386/278
(Continued)

FOREIGN PATENT DOCUMENTS

CN 103442252 A 12/2013
CN 103873916 A 6/2014
(Continued)

OTHER PUBLICATIONS

Tencent Technology, WO, PCT/CN2019/081012, dated Jul. 1, 2019, 5 pgs.
(Continued)

Primary Examiner — John R Schnurr
(74) Attorney, Agent, or Firm — Morgan, Lewis & Bockius LLP

(57) ABSTRACT

This application discloses an image display method performed at a terminal device. While playing a multimedia resource and after detecting that a target operation is performed on a playback progress bar of the multimedia resource, the terminal device obtains a target playback time point at which a target operation is to be performed on the playback progress bar in the multimedia resource. The terminal device determines a target region corresponding to the target playback time point in a target image, the target image comprising a plurality of regions, each region having a correspondence with a respective one of a plurality of playback time points of the multimedia resource, and displays a portion of the target image corresponding to the target region adjacent the playback progress bar. This application resolves the technical problem of relatively low image display efficiency in related art.

18 Claims, 13 Drawing Sheets

(56) References Cited

U.S. PATENT DOCUMENTS

| | | | |
|---|---|---|---|
| 2012/0321280 A1* | 12/2012 | Lin | ............... G11B 27/105 386/240 |
| 2014/0149555 A1 | 5/2014 | Bank et al. | |
| 2014/0282262 A1 | 9/2014 | Gregotski et al. | |
| 2019/0200089 A1* | 6/2019 | Pio | ............ H04N 21/47217 |

FOREIGN PATENT DOCUMENTS

| | | | |
|---|---|---|---|
| CN | 103905835 A | 7/2014 |
| CN | 105100961 A | 11/2015 |
| CN | 105721620 A | 6/2016 |
| CN | 106028068 A | 10/2016 |
| CN | 107277628 A | 10/2017 |
| CN | 107872729 A | 4/2018 |
| CN | 108632676 A | 10/2018 |

OTHER PUBLICATIONS

Tencent Technology, IPRP, PCT/CN2019/081012, dated Nov. 17, 2020, 6 pgs.
Tencent Technology, ISR, PCT/CN2019/081012, dated Jul. 1, 2019, 3 pgs.

* cited by examiner

IMAGE DISPLAY METHOD AND GENERATING METHOD, DEVICE, STORAGE MEDIUM AND ELECTRONIC DEVICE

CROSS REFERENCE TO RELATED APPLICATIONS

This application is a continuation application of PCT Patent Application No. PCT/CN2019/081012, entitled "MAGE DISPLAY METHOD AND GENERATING METHOD, DEVICE, STORAGE MEDIUM AND ELECTRONIC DEVICE" filed on Apr. 2, 2019, which claims priority to Chinese Patent Application No. 201810449296.3, entitled "IMAGE DISPLAY METHOD AND APPARATUS, STORAGE MEDIUM, AND ELECTRONIC DEVICE" filed May 11, 2018, all of which are incorporated by reference in their entirety.

FIELD OF THE TECHNOLOGY

This application relates to the field of computers, and specifically, to image display and image generation.

BACKGROUND OF THE DISCLOSURE

With continuous improvement of network environments, the Internet has gone deep into every aspect of people's life. Multimedia products can provide better audio-visual experience and therefore are appreciated by the public. When playing a multimedia resource, a user may view a screenshot of the multimedia resource at a moment by hovering a mouse over a playback progress bar, to learn contents of the multimedia resource. A client for viewing the multimedia resource needs to display the screenshot. Currently, the related display manner is to automatically take a screenshot and display each image.

SUMMARY

Embodiments of this application provide an image display method and apparatus, an image generation method and apparatus, a storage medium, and an electronic device, to resolve at least the technical problem of relatively low image display efficiency in the related art.

According to an aspect of the embodiments of this application, an image display method is provided. The method is applied to a terminal device and includes: while playing a multimedia resource on the display, obtaining, in response to detecting that a target operation is performed on a playback progress bar of the multimedia resource, a target playback time point at which a target operation is to be performed on the playback progress bar in the multimedia resource; determining a target region corresponding to the target playback time point in a target image, the target image comprising a plurality of regions, each region having a correspondence with a respective one of a plurality of playback time points of the multimedia resource, the plurality of regions comprising the target region, and the plurality of playback time points comprising the target playback time point; and displaying a portion of the target image corresponding to the target region adjacent the playback progress bar.

According to another aspect of the embodiments of this application, a non-transitory computer-readable storage medium is further provided. The storage medium stores a plurality of computer programs, the plurality of computer programs being configured to perform, when executed by a processor of a terminal device, the method according to any one of the aspects described above.

According to another aspect of the embodiments of this application, a terminal device is further provided. The terminal device includes a memory and a processor, the memory storing a plurality of computer programs, and the processor being configured to execute the plurality of computer programs and perform the method according to any one of the aspects described above.

BRIEF DESCRIPTION OF THE DRAWINGS

The accompanying drawings described herein are used to provide further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The terms such as "first" and "second" in the specification, the claims and the accompanying drawings of this application are intended to distinguish between similar objects, but are not necessarily used for describing a specific sequence or a precedence level. It is to be understood that the data termed in such a way are interchangeable in proper circumstances, so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
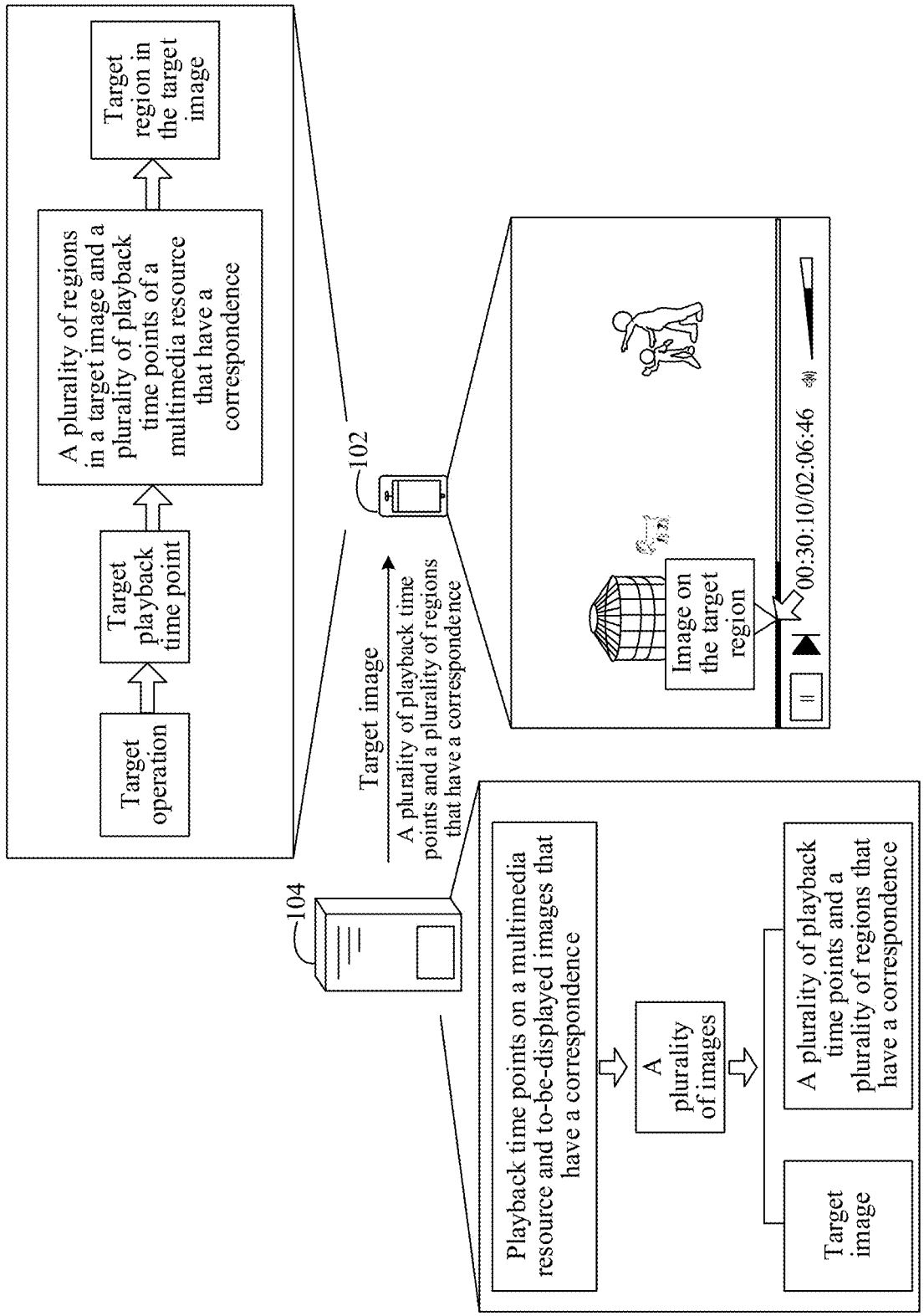
FIG. 1 is a schematic diagram 1 of an application environment of an optional image display method according to an embodiment of this application.

According to an aspect of the embodiments of this application, an image display method provided in an embodiment of this application may be applied to, but not limited to, a hardware environment formed by a client 102 and a server 104 shown in FIG. 1. As shown in FIG. 1, the server 104 obtains playback time points on a multimedia resource and to-be-displayed images that have a correspondence, the playback time points on the multimedia resource including a plurality of playback time points, and the to-be-displayed images including a plurality of images; splices the plurality of images into a target image, a region at which each of the plurality of images is located on the target image being one of a plurality of regions included in the target image; and transmits the target image and the plurality of playback time points and the plurality of regions that have a correspondence to the client 102 playing the multimedia resource. The client 102 obtains, in response to detecting that a target operation is performed on a playback progress bar of a multimedia resource, a target playback time point corresponding to a target operation position on which the target operation is performed on the playback progress bar in the multimedia resource; determines a target region corresponding to the target playback time point in a target image; and displays an image on the target region.

Optionally, in this embodiment, the client 102 may be installed on, but not limited to, a terminal device. The terminal device may include, but not limited to: a mobile phone, a tablet computer, a personal computer (PC), a smart wearable device, a smart appliance, a smart home device, and the like. The server may be an independent server, or may be a cluster server.

Figure 2:
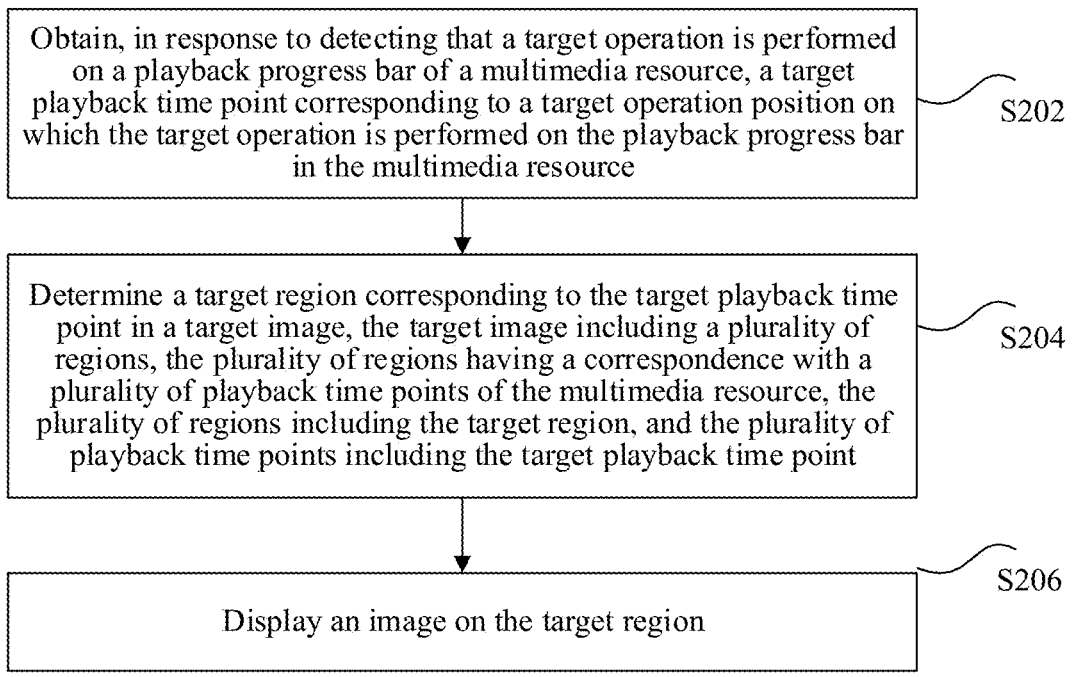
FIG. 2 is a schematic diagram of an optional image display method according to an embodiment of this application.

According to an aspect of the embodiments of this application, an image display method is provided. As shown in FIG. 2, the method may be performed by the client 102 shown in FIG. 1, and includes the following steps:

S202: Obtain, in response to detecting that a target operation is performed on a playback progress bar of a multimedia resource, a target playback time point corresponding to a target operation position on which the target operation is performed on the playback progress bar in the multimedia resource.

S204: Determine a target region corresponding to the target playback time point in a target image, the target image including a plurality of regions, the plurality of regions having a correspondence with a plurality of playback time points of the multimedia resource, the plurality of regions including the target region, and the plurality of playback time points including the target playback time point.

S206: Display an image on the target region.

Figure 3:
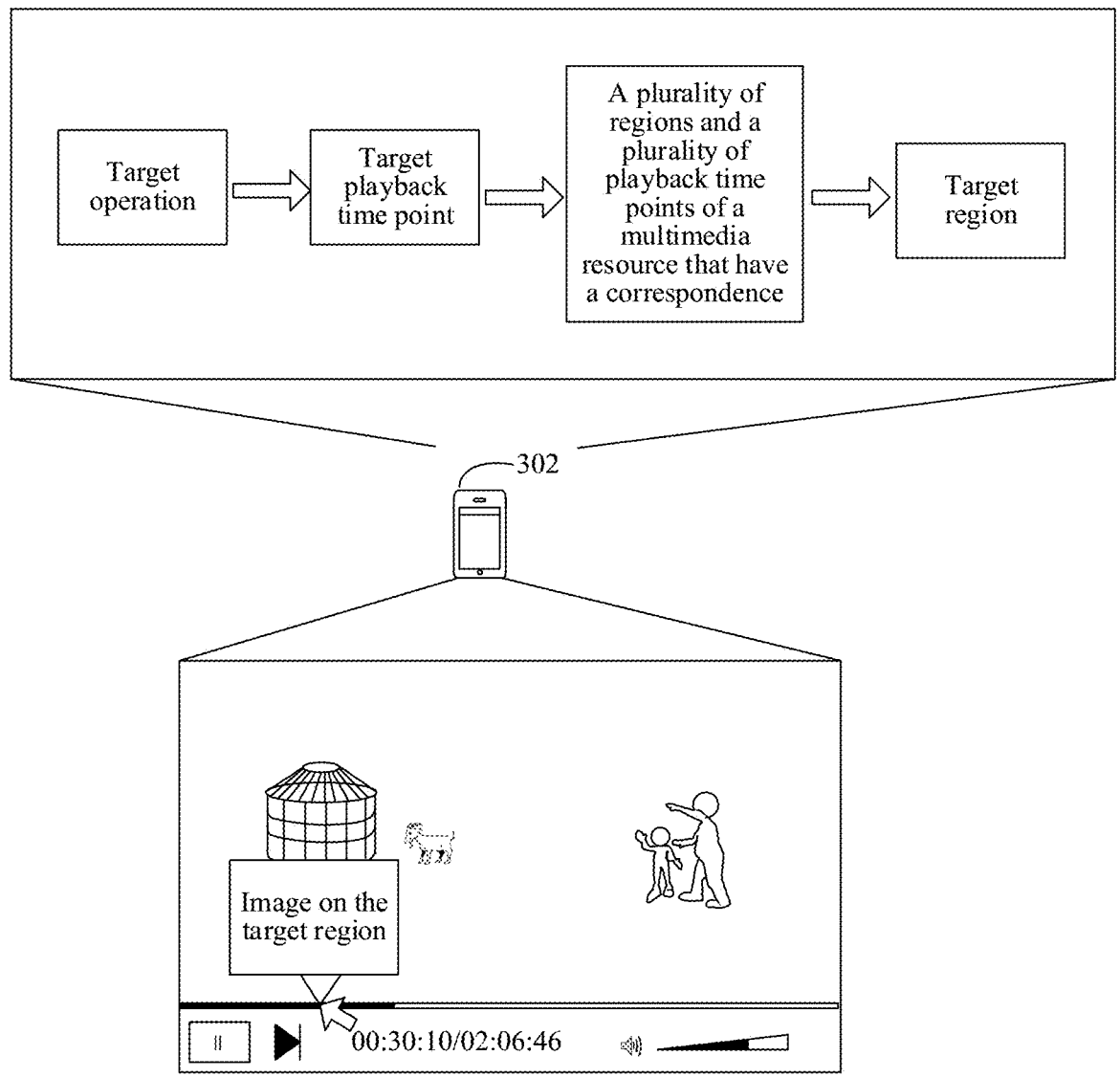
FIG. 3 is a schematic diagram 2 of an application environment of an optional image display method according to an embodiment of this application.

Optionally, in this embodiment, the image display method may be applied to a hardware environment formed by a client 302 shown in FIG. 3. As shown in FIG. 3, the client 302 configured in a terminal device obtains, in response to detecting that a target operation is performed on a playback progress bar of a multimedia resource, a target playback time point corresponding to a target operation position on which the target operation is performed on the playback progress bar in the multimedia resource; determines a target region corresponding to the target playback time point in a target image, the target image including a plurality of regions, the plurality of regions having a correspondence with a plurality of playback time points of the multimedia resource, the plurality of regions including the target region, and the plurality of playback time points including the target playback time point; and displays an image on the target region.

Optionally, in this embodiment, the client 302 may be, but not limited to, the client 102 shown in FIG. 1.

Optionally, in this embodiment, the image display method may be applied to, but is not limited to, a scenario in which an image is displayed on a client. The client may be, but not limited to, various types of applications such as an online education application, an instant messaging application, a community space application, a game application, a shopping application, a browser application, a financial application, a multimedia application, and a live streaming application. Specifically, the image display method may be applied to, but not limited to, a scenario in which an image is displayed on a client of the multimedia application, or may be applied to, but not limited to, a scenario in which an image is displayed on a client of the live streaming application, to improve image display efficiency. The foregoing description is merely an example, and no limitation is imposed in this embodiment.

Optionally, in this embodiment, the multimedia resource may include, but not limited to, a video resource (such as a video stream or a video file), an audio resource (such as an audio stream or an audio file), a slide file, a dynamic album, a dynamic picture, and the like.

Optionally, in this embodiment, the target operation may include, but not limited to, clicking, stopping, moving, dragging, and the like. For example, a user controls a mouse pointer to move up and down at a position on the playback progress bar. The moving operation may be determined as the target operation, and an intersection between a moving path during the moving process and the playback progress bar is determined as the target operation position of the target operation. Alternatively, for another example, a user controls a mouse pointer to stop at a position on the playback progress bar. When it is detected that a stopping time reaches a preset time (for example, 2 seconds), it is determined that a target operation performed on the playback progress bar of the multimedia resource is detected, and the position at which the mouse pointer is stopped is determined as the target operation position of the target operation.

Optionally, in this embodiment, the target image is divided into a plurality of regions. Each region corresponds to one or more playback time points of the multimedia resource, and an image on the region is an image needing to be displayed when the target operation is detected at a playback time point corresponding to the region.

Optionally, in this embodiment, the image needing to be displayed may be, but not limited to be, preset for a playback time point, or may be obtained by taking a screenshot for the multimedia resource.

Optionally, in this embodiment, a manner for displaying the image on the target region may be switching a displayed image to the image on the target region on the display interface of the multimedia resource, or may be displaying in a specified region on the display interface.

Figure 4:
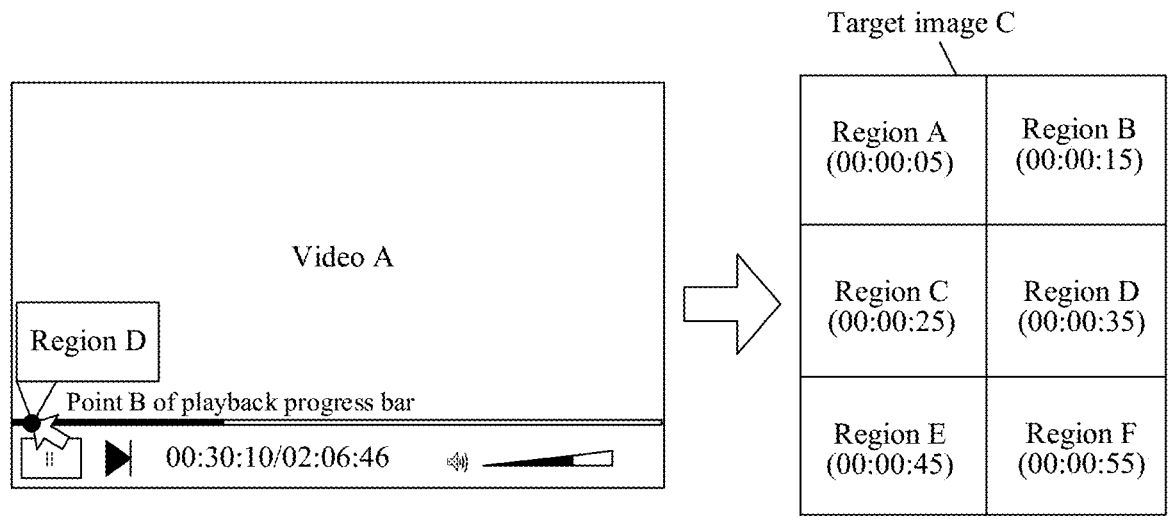
FIG. 4 is a schematic diagram 1 of an optional image display method according to an optional implementation of this application.

In an optional implementation, as shown in FIG. 4, a video A is played on a client, and a user stops a mouse pointer on a point B of a playback progress bar. When a stopping time reaches 1.5 second, the client detects a target operation performed on the playback progress bar of the video A, and determines that a target operation position of the target operation is the point B of the playback progress bar. If a target playback time point corresponding to the point B of the playback progress bar in the video A is 00:00:35, that is, the 35$^{th}$ second, and the client determines that a target region corresponding to the target playback time point 00:00:35 on a target image C is a region D, an image on the region D is displayed above the point B of the playback progress bar.

It may be seen that through the foregoing steps, when the target operation performed on the playback progress bar of the multimedia resource is detected, the target region corresponding to the target playback time point in the target image is determined according to the target playback time point corresponding to the target operation position, and the image in the target region is displayed, so that one target image can correspond to image display at a plurality of playback time points in the multimedia resource, so as to avoid a need to obtain an image at each playback time point, and reduce a quantity of inputs/outputs between the client and the server, thereby achieving the technical effect of improving image display efficiency, and further resolving the technical problem of a relatively low image display efficiency in related art.

In an optional solution, the determining a target region corresponding to the target playback time point in a target image includes:

S1: obtaining the target image and the playback time points and the regions that have the correspondence and correspond to the target image, images on all the plurality of regions being screenshot images of the multimedia resource at playback time points respectively corresponding to the regions; and S2: obtaining the target region corresponding to the target playback time point from the playback time points and the regions that have the correspondence.

Optionally, in this embodiment, an image on each of the plurality of regions may be, but not limited to, a screenshot image in the multimedia resource at a playback time point corresponding to the region. While a screenshot is being taken, a correspondence between a playback time point of the image obtained by taking the screenshot and a region of the image obtained by taking the screenshot in the target image may be recorded, and the target image and the correspondence are obtained, so as to determine the target region corresponding to the target playback time point according to the correspondence.

Optionally, in this embodiment, the playback time points and the regions that have a correspondence may be, but not limited to be, stored in a form of an index file.

In an optional solution, the obtaining the target image and the playback time points and the regions that have the correspondence and correspond to the target image includes:

S1: determining a target time segment into which the target playback time point falls in a plurality of playback time segments, a playback time of the multimedia resource being divided into the plurality of playback time segments, the plurality of playback time segments being in a one-to-one correspondence with a plurality of images, and the plurality of images including the target image; and S2: obtaining the target image corresponding to the target time segment in the plurality of images, and the playback time points and the regions that have the correspondence and correspond to the target image.

Optionally, in this embodiment, the playback time of the multimedia resource may be divided into a plurality of playback time segments. Each playback time segment corresponds to one image. An image corresponding to a target playback time segment into which the target playback time point falls may be determined as the target image. During obtaining of the target image, the playback time points and the regions that have the correspondence and correspond to the target image may also be obtained.

Figure 5:
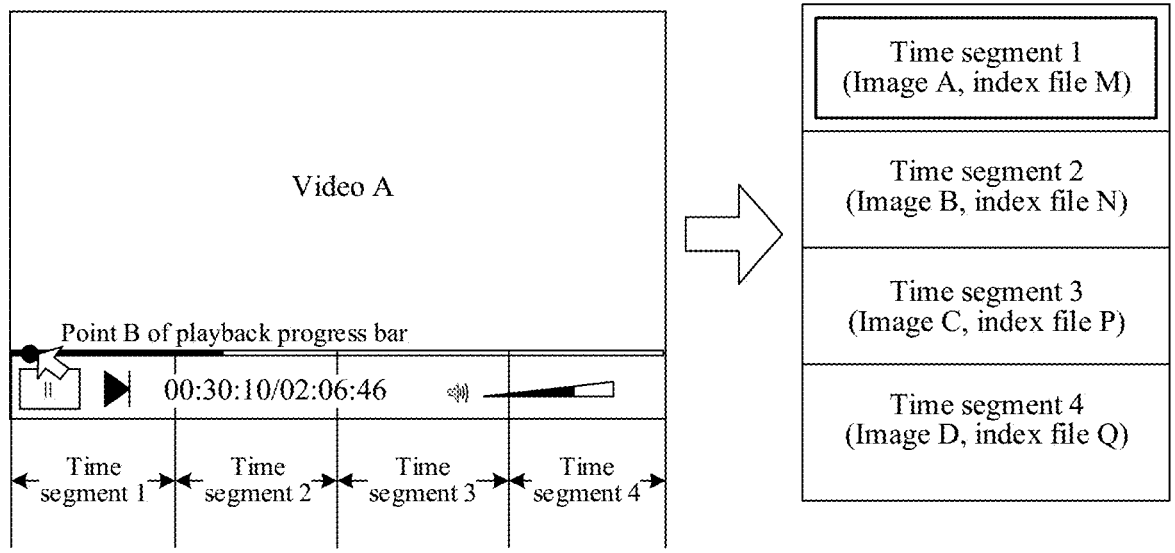
FIG. 5 is a schematic diagram 2 of an optional image display method according to an optional implementation of this application.

In an optional implementation, as shown in FIG. 5, a playback time of a video resource A is divided into a plurality of playback time segments, including: a time segment 1, a time segment 2, a time segment 3, and a time segment 4. The time segment 1 corresponds to an image A; the time segment 2 corresponds to an image B; the time segment 3 corresponds to an image C; and the time segment 4 corresponds to an image D. If a target operation position is a point B of a playback progress bar, a target playback time point corresponding to the point is 00:00:35. and the target playback time point falls into the time segment 1, the image A corresponding to the time segment 1 is used as a target image, and an index file M that stores playback time points and regions that have a correspondence and corresponds to the image A is obtained.

Optionally, in this embodiment, all information such as the playback time segments and the images that have a correspondence, and the images, the playback time points, and the regions that have a correspondence may be stored in a form of an index file.

In an optional solution, the obtaining the target region corresponding to the target playback time point from the playback time points and the regions that have the correspondence includes:

S1: determining a target position according to the target playback time point, a start time point of the target image, and a screenshot time interval, the start time point being an earliest time point in the playback time points corresponding to the plurality of regions on the target image, the screenshot time interval being an interval between two adjacent playback time points, and the target position being used for indicating a position of the target playback time point in a playback time segment of the multimedia resource that corresponds to the target image;

S2: determining a display position of the target region on the target image according to the target position and an arrangement rule of the screenshot images in the target image; and S3: determining a region with a target size that is on the target image and located on the display position as the target region, the target image being obtained by splicing the screenshot images with the target size, and the screenshot images being arranged on the target image according to the arrangement rule.

Optionally, in this embodiment, the target region corresponding to the target playback time point may be determined according to, but not limited to, information such the target playback time point, the start time point of the target image, the screenshot time interval, the arrangement rule of the screenshot images in the target image, and the target size of the target region.

Optionally, in this embodiment, the arrangement rule of the screenshot images in the target image may include, but not limited to: arranging in rows, arranging in columns, arranging in a preset sequence, and the like.

In an optional solution, the determining a target position according to the target playback time point, a start time point of the target image, and a screenshot time interval includes:

S1: determining a difference between the target playback time point and the start time point of the target image; and S2: determining a ratio of the difference to the screenshot time interval as the target position.

Figure 6:
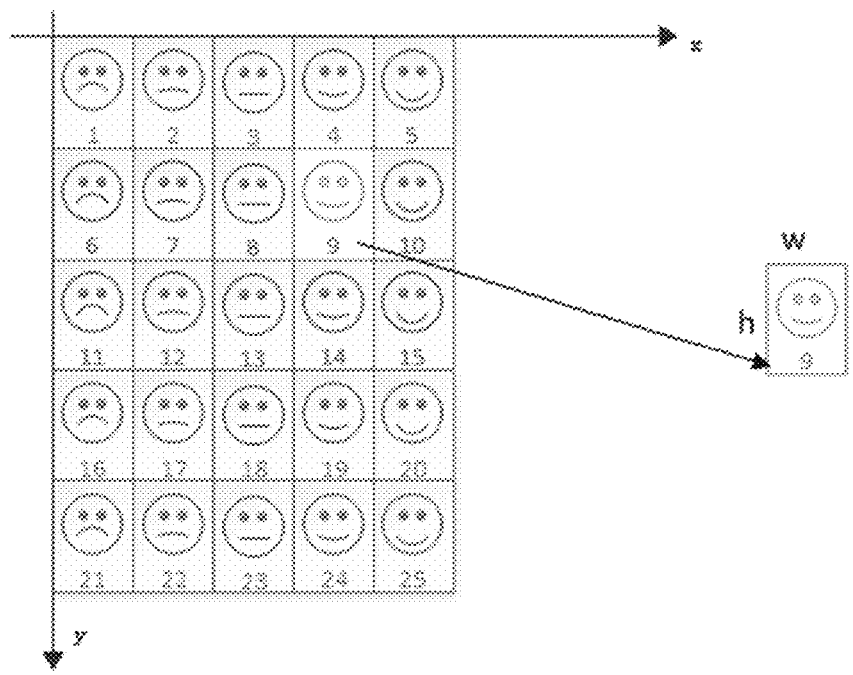
FIG. 6 is a schematic diagram 3 of an optional image display method according to an optional implementation of this application.

In an optional implementation, as shown in FIG. 6, the target image is formed by a plurality of regions, and each region corresponds to one playback time point of the multimedia resource. The target image is located in a coordinate system xOy. The target region corresponding to the target playback time point may be obtained according to, but not limited to, the following manner:

The target image has images of s regions, and the images are spliced into the target image in m rows and in n columns. The splicing rule is: arranging in rows; an image of each region having a width w and a height h; and counting starting from 0.

An index position of the target region (namely, the target position) i=(the target playback time point–a time point of a first picture of the target image)/the screenshot time interval.

A row ai at which the target region is located is i/n, and a column aj at which the target region is located is i%m−1, so that coordinates of the target region in the target image is: x=aj*w, and y=ai*h. A region range of the target region may be obtained by combining the coordinates (x, y) of the target region with the width and the height (w, h), and the target region may be displayed on the client.

A manner for determining the target region when the images of the plurality of regions in the target image are arranged in columns is similar to this manner. Details are not described herein again.

In an optional solution, the displaying an image on the target region includes:

S1: switching a playback interface of the multimedia resource to playing the image on the target region; or S2: displaying the image on the target region on a predetermined interface in the playback interface of the multimedia resource.

Optionally, in this embodiment, the display position of the image on the target region may include, but not limited to, the playback interface of the multimedia resource, the predetermined interface on the playback interface of the multimedia resource, or the like.

Optionally, in this embodiment, the predetermined interface on the playback interface of the multimedia resource may be located at a position above the target operation position, or may be located at a position surrounding the playback interface. A size of the predetermined interface may be configured.

Figure 7:
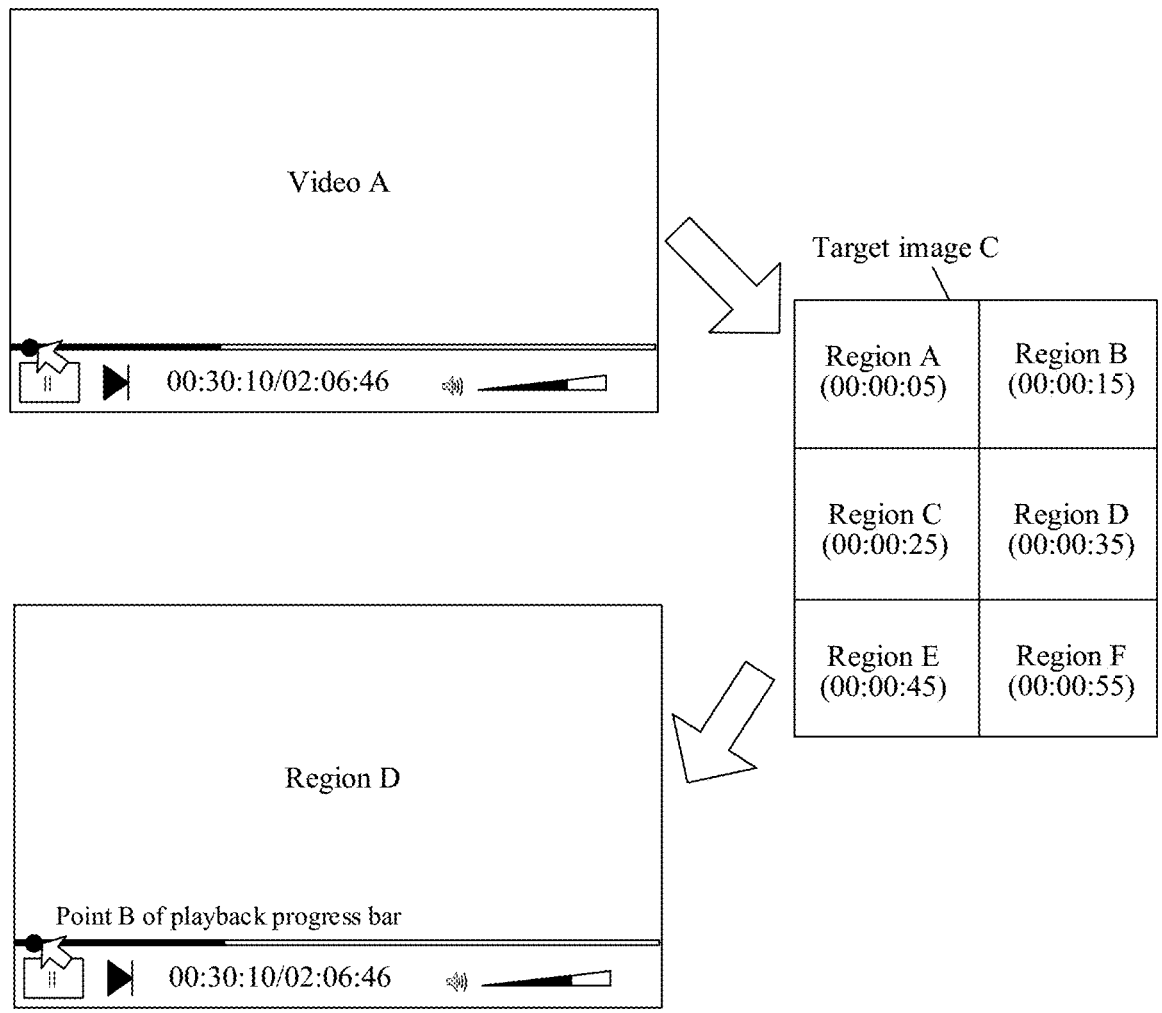
FIG. 7 is a schematic diagram 4 of an optional image display method according to an optional implementation of this application.

In an optional implementation, as shown in FIG. 7, a video A is played on a client, and a user stops a mouse pointer on a point B of a playback progress bar. When a stopping time reaches 1.5 second, the client detects a target operation performed on the playback progress bar of the video A, and determines that a target operation position of the target operation is the point B of the playback progress bar. If a target playback time point corresponding to the point B of the playback progress bar in the video A is 00:00:35, that is, the 35$^{th}$ second, and the client determines that a target region corresponding to the target playback time point 00:00:35 on a target image C is a region D, a playback interface of the video A is switched to display an image A4.

Figure 8:
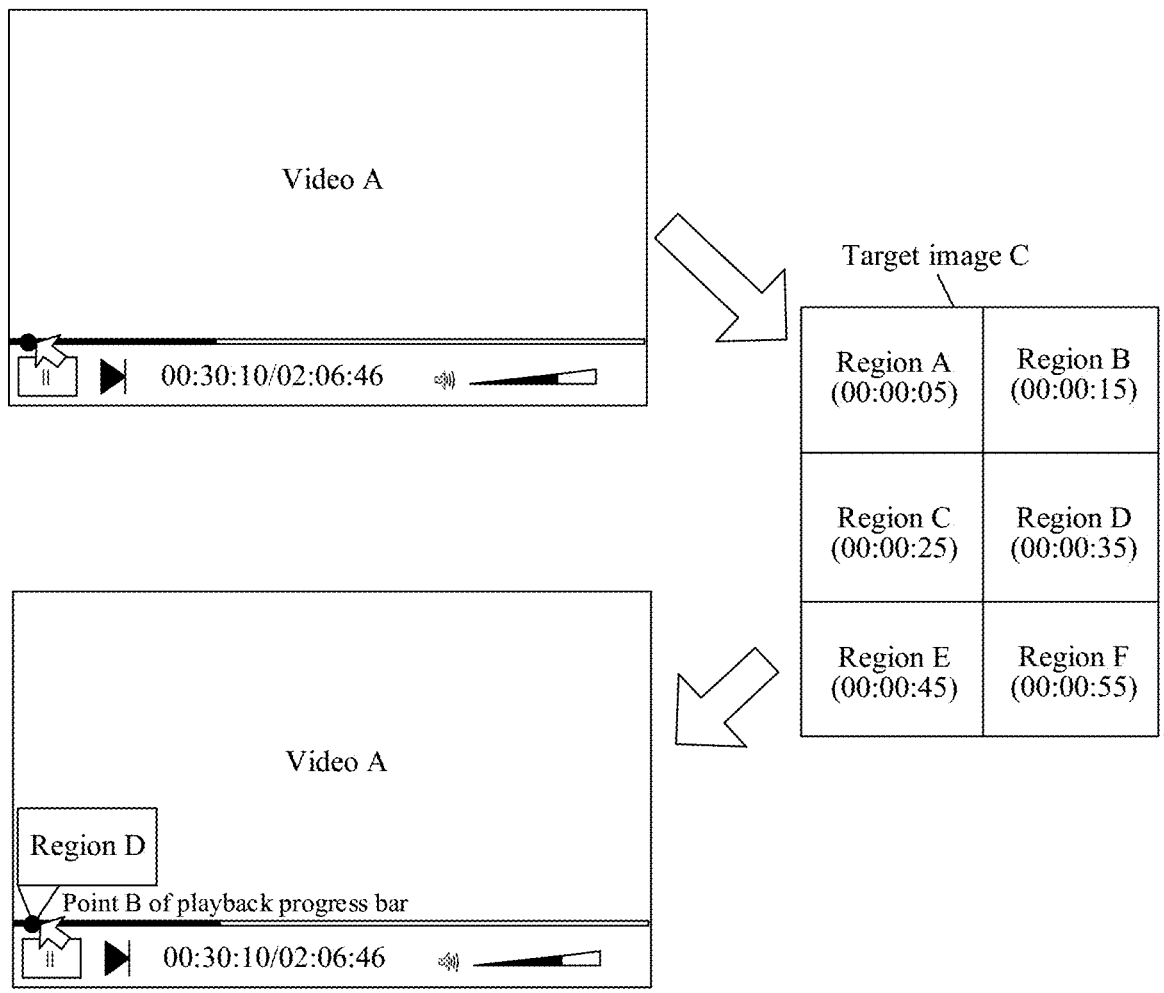
FIG. 8 is a schematic diagram 5 of an optional image display method according to an optional implementation of this application.

In another optional implementation, as shown in FIG. 8, a video A is played on a client, and a user stops a mouse pointer on a point B of a playback progress bar. When a stopping time reaches 1.5 second, the client detects a target operation performed on the playback progress bar of the video A, and determines that a target operation position of the target operation is the point B of the playback progress bar. If a target playback time point corresponding to the point B of the playback progress bar in the video A is 00:00:35, that is, the 35$^{th}$ second, and the client determines that a target region corresponding to the target playback time point 00:00:35 on a target image C is a region D, an image A4 on the region D is displayed above the point B of the playback progress bar.

In an optional solution, before the determining a target region corresponding to the target playback time point in a target image, the method further includes:

S1: taking screenshots of images of the multimedia resource at the plurality of playback time points, to obtain a plurality of screenshot images having a correspondence with the plurality of playback time points;

S2: splicing the plurality of screenshot images into the target image, a region at which each of the plurality of screenshot images is located on the target image being one of the plurality of regions; and S3: storing the target image and recording a correspondence between the plurality of playback time points and the plurality of regions.

Optionally, in this embodiment, the foregoing process may be performed, but not limited to, on a server side. The server takes screenshots for the multimedia resource, and splices and stores the screenshot images. The client obtains the target image and information of the target image through an interaction with the server.

Figure 9:
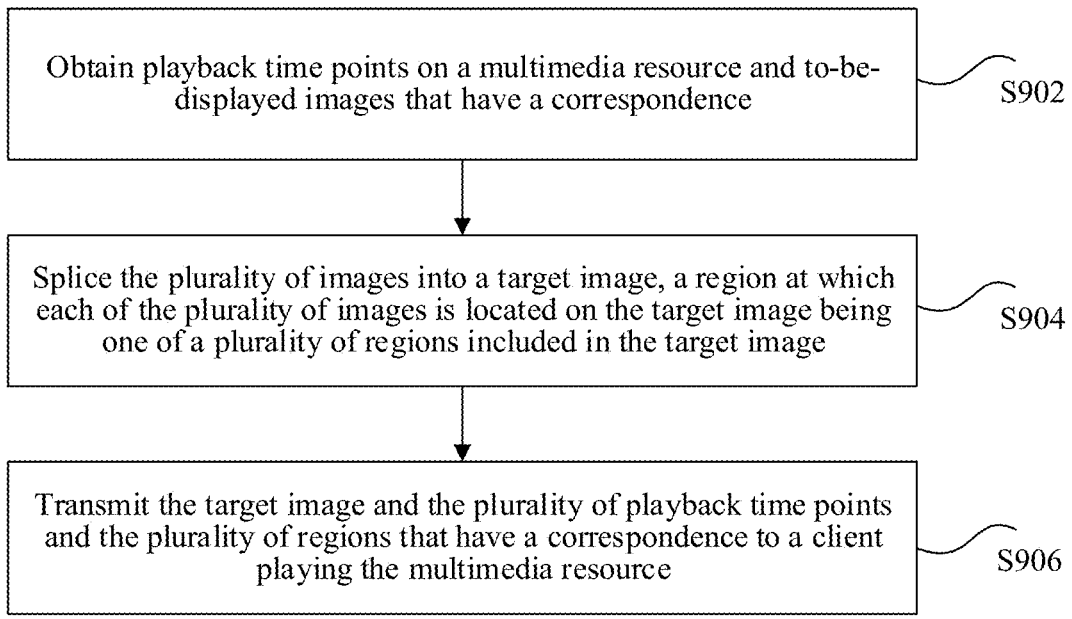
FIG. 9 is a schematic diagram of another optional image display method according to an embodiment of this application.

According to another aspect of the embodiments of this application, an image generation method is further provided. The method may be applied to a server, and as shown in FIG. 9, the method includes the following steps:

S902: Obtain playback time points on a multimedia resource and to-be-displayed images that have a correspondence, the playback time points on the multimedia resource including a plurality of playback time points, and the to-be-displayed images including a plurality of images.

S904: Splice the plurality of images into a target image, a region at which each of the plurality of images is located on the target image being one of a plurality of regions included in the target image.

S906: Transmit the target image and the plurality of playback time points and the plurality of regions that have a correspondence to a client playing the multimedia resource, the target image being used for instructing the client to: obtain, in response to detecting that a target operation is performed on a playback progress bar of the multimedia resource, a target playback time point corresponding to a target operation position on which the target operation is performed on the playback progress bar in the multimedia resource; determine a target region corresponding to the target playback time point in the target image; and display an image on the target region.

Optionally, in this embodiment, the image generation method may be applied to, but not limited to, the server corresponding to the client.

Figure 10:
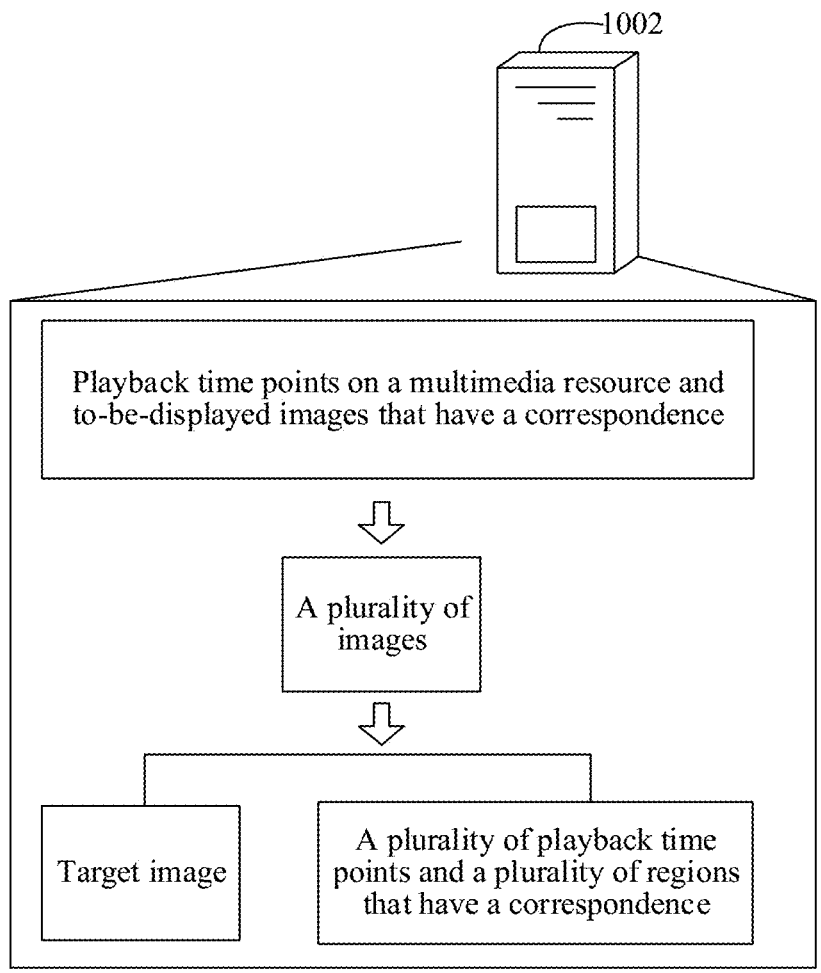
FIG. 10 is a schematic diagram 3 of an application environment of an optional image display method according to an embodiment of this application.

Optionally, in this embodiment, the image generation method may be applied to a hardware environment formed by a server 1002 shown in FIG. 10. As shown in FIG. 10, the server 1002 obtains playback time points on a multimedia resource and to-be-displayed images that have a correspondence, the playback time points on the multimedia resource including a plurality of playback time points, and the to-be-displayed images including a plurality of images; splices the plurality of images into a target image, a region at which each of the plurality of images is located on the target image being one of a plurality of regions included in the target image; and transmits the target image and the plurality of playback time points and the plurality of regions that have a correspondence to the client playing the multimedia resource, the target image being used for instructing the client to: determine, in response to detecting that a target operation is performed on a playback progress bar of the multimedia resource, a target playback time point corresponding to a target operation position on which the target operation is performed on the playback progress bar in the multimedia resource; determine a target region corresponding to the target playback time point in the target image; and display an image on the target region.

Optionally, in this embodiment, the server 1002 may include, but not limited to, the server 104 shown in FIG. 1.

Optionally, in this embodiment, the multimedia resource may include, but not limited to, a video resource (such as a video stream or a video file), an audio resource (such as an audio stream or an audio file), a slide file, a dynamic album, a dynamic picture, and the like.

Optionally, in this embodiment, the target operation may include, but not limited to, clicking, stopping, moving, dragging, and the like. For example, a user controls a mouse pointer to move up and down at a position on the playback progress bar. The moving operation may be determined as the target operation, and an intersection between a moving path during the moving process and the playback progress bar is determined as the target operation position of the target operation. Alternatively, for another example, a user controls a mouse pointer to stop at a position on the playback progress bar. When it is detected that a stopping time reaches a preset time (for example, 2 seconds), it is determined that a target operation performed on the playback progress bar of the multimedia resource is detected, and the position at which the mouse pointer is stopped is determined as the target operation position of the target operation.

Optionally, in this embodiment, the target image is divided into a plurality of regions. Each region corresponds to one or more playback time points of the multimedia resource, and an image on the region is an image needing to be displayed when the target operation is detected at a playback time point corresponding to the region.

Optionally, in this embodiment, the image needing to be displayed may be, but not limited to, preset for a playback time point, or may be obtained by taking a screenshot for the multimedia resource.

Figure 11:
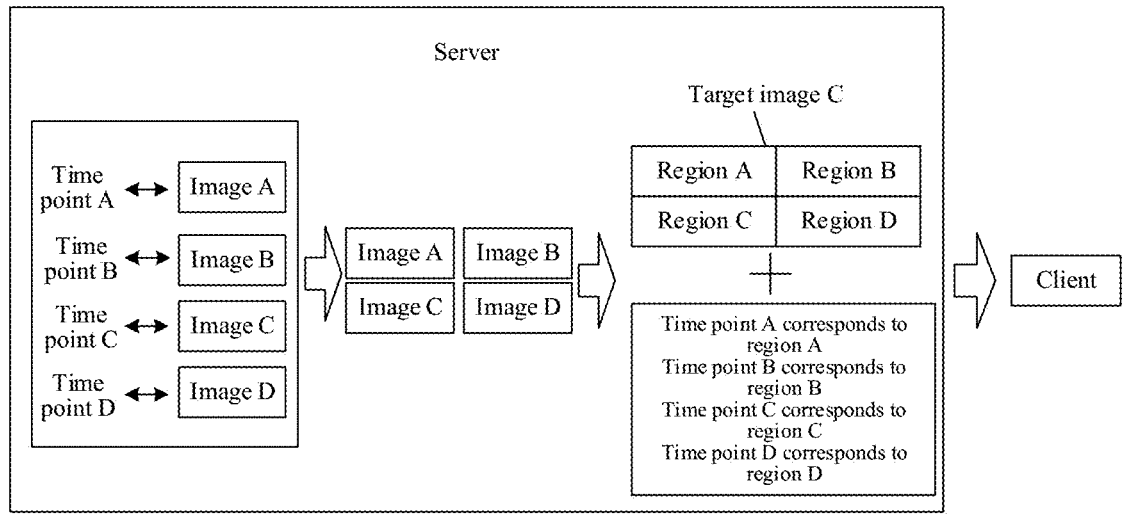
FIG. 11 is a schematic diagram 1 of another optional image display method according to an optional implementation of this application.

In an optional implementation, as shown in FIG. 11, the server obtains playback time points (a time point A, a time point B, a time point C, and a time point D) on a video A and to-be-displayed images (an image A, an image B, an image C, and an image D) that have a correspondence, splices the image A, the image B, the image C, and the image D into a target image C, and transmits the target image C and the plurality of playback time points and a plurality of regions that have a correspondence (the time point A corresponds to a region A, the time point B corresponds to a region B, the time point C corresponds to a region C, and the time point D corresponds to a region D) to a client playing the video A.

Optionally, a video A is played on a client, and a user stops a mouse pointer on a point B of a playback progress bar. When a stopping time reaches 1.5 second, the client detects a target operation performed on the playback progress bar of the video A, and determines that a target operation position of the target operation is the point B of the playback progress bar. If a target playback time point corresponding to the point B of the playback progress bar in the video A is a time point A, and the client determines that a target region corresponding to the time point A on a target image C is a region A, an image on the region A is displayed above the point B of the playback progress bar.

It may be seen that through the foregoing steps, the playback time points on the multimedia resource and the to-be-displayed images that have the correspondence are obtained, the plurality of images are spliced into the target image, and the target image and the playback time points and the regions that have the correspondence are transmitted to the client. When detecting the target operation performed on the playback progress bar of the multimedia resource, the client determines the target region corresponding to the target playback time point in the target image according to the target playback time point corresponding to the target operation position, and displays the image in the target region, so that one target image can correspond to image display at a plurality of playback time points in the multimedia resource, so as to avoid a need to obtain an image at each playback time point, and reduce a quantity of inputs/outputs between the client and the server, thereby achieving the technical effect of improving image display efficiency, and further resolving the technical problem of a relatively low image display efficiency in related art.

In an optional solution, the obtaining playback time points on a multimedia resource and to-be-displayed images that have a correspondence includes:

S1: taking screenshots of images of the multimedia resource at the plurality of playback time points, to obtain the plurality of images having the correspondence with the plurality of playback time points; or S2: receiving the plurality of images and the correspondence between the plurality of images and the plurality of playback time points.

Optionally, in this embodiment, the to-be-displayed images may be obtained by taking screenshots for the multimedia resource, or may be preconfigured.

In an optional solution, the multimedia resource includes a multimedia data stream, and the taking screenshots of images of the multimedia resource at the plurality of playback time points, to obtain the plurality of images having the correspondence with the plurality of playback time points includes:

S1: taking screenshots for the multimedia data stream according to a first time interval from a time point of starting obtaining the multimedia data stream, and recording playback time points that correspond to images obtained by taking screenshots and that are in the multimedia data stream;

S2: determining images that are obtained by taking screenshots within a current playback time segment at an interval of a target playback time length as the plurality of images corresponding to the current playback time segment, and determining playback time points of the plurality of images corresponding to the current playback time segment as the plurality of playback time points; and S3: recording playback time segments, playback time points, and images that have a correspondence.

Optionally, in this embodiment, the multimedia resource may include a multimedia data stream (such as a video stream, an audio stream, or a picture stream). For the multimedia data stream, screenshots may be taken according to the first time interval, and images obtained by taking screenshots within the current playback time segment are spliced at an interval of the target playback time length, to obtain a target image.

Optionally, in this embodiment, the playback time segments, the playback time points, and the images that have a correspondence may be recorded in a form of generating an index file.

Figure 12:
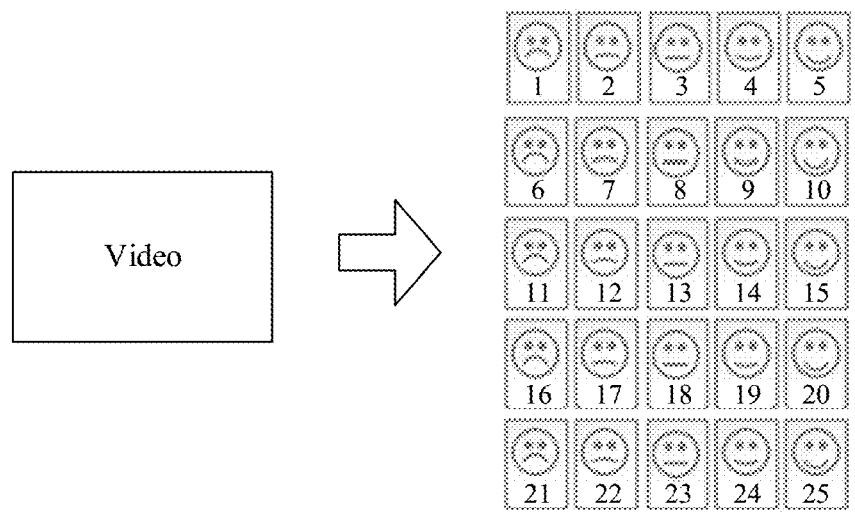
FIG. 12 is a schematic diagram 2 of another optional image display method according to an optional implementation of this application.
Figure 13:
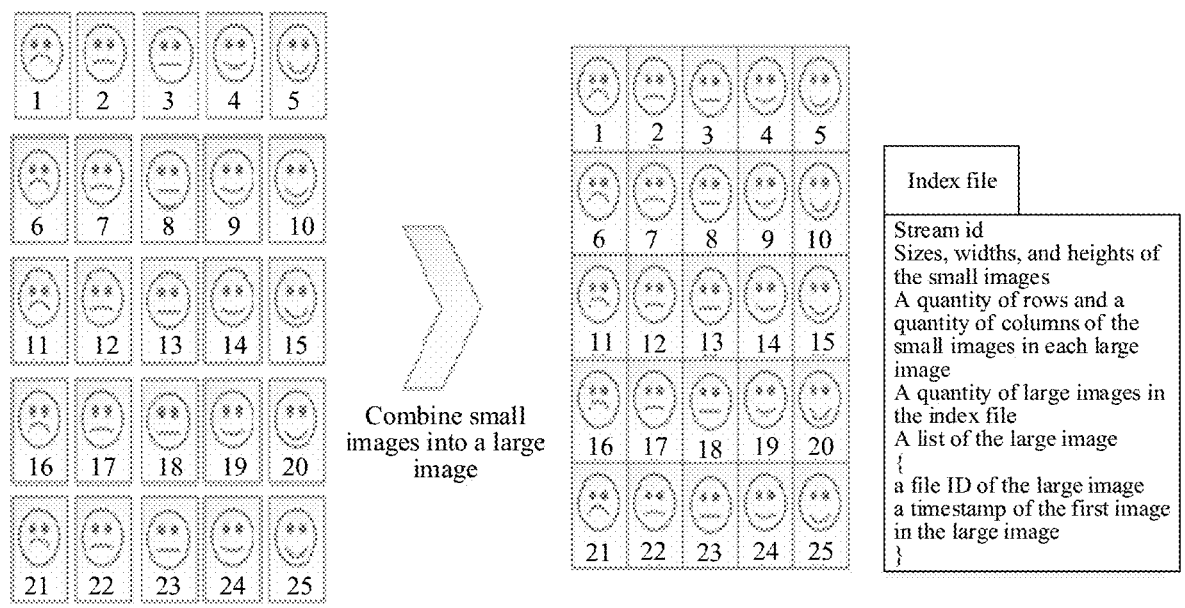
FIG. 13 is a schematic diagram 3 of another optional image display method according to an optional implementation of this application.

In an optional implementation, using video live streaming as an example, as shown in FIG. 12, raw images are periodically obtained by taking screenshots from a live stream by using a screenshot taking service, and are cropped and zoomed into a required small image size. The images are uploaded to an image storage service, and timestamps of the images are stored into sidPicTimetampList<timestamp> of a redis list by using a stream ID (sid) as a key. Timestamps of all the screenshots of sid are recorded. A screenshot list of a current stream is read from redis by using a thumbnail service, and for each stream, the following processing is performed: reading a screenshot list of the stream, for example, reading a screenshot list within an hour, from the redis; downloading images corresponding to the stream by using an image service; splicing the images into a large image in an m*n form; and generating a thumbnail index file of the current stream. As shown in FIG. 13, 25 small images are combined into a large image in 5 rows and 5 columns, and an index file is generated. Each small image is a region in the large image.

Optionally, in this implementation, the index file is in the following form:

an index file name and a downloading url: one index file is generated in one playback time segment; one index file includes information of a plurality of large images; and each large image is obtained by combining several small images. In this implementation, a one-hour live stream generates one index file, and one large image includes small images of 5 rows and 5 columns.

A manner for naming the index file is: sid+"_timestamp_index_file_"+timeHour, where sid is a stream ID, a time format of timeHour is YYYYMMDDHH, for example, 2018012720.

Optionally, in this implementation, the server transmits the spliced target image and the index file to the client, so that the client may display a corresponding thumbnail according to the detected target operation and information provided in the index file.

In an optional solution, the multimedia resource includes a multimedia file, and the taking screenshots of images of the multimedia resource at the plurality of playback time points, to obtain the plurality of images having the correspondence with the plurality of playback time points includes:

S1: dividing a playback time of the multimedia file into a plurality of playback time segments;

S2: taking screenshots for a multimedia resource, in the multimedia file, corresponding to each of the plurality of playback time segments according to a second time interval, to obtain the plurality of images corresponding to the playback time segment and the playback time points having the correspondence with the plurality of images; and S3: recording playback time segments, playback time points, and images that have a correspondence.

Optionally, in this embodiment, the multimedia resource includes a multimedia file (such as a video file, an audio file, a dynamic album, or a slide file). The server may divide the playback time of the multimedia resource into a plurality of playback time segments, take screenshots for the multimedia resource at each playback time segment according to the second time interval, and splice images obtained by taking screenshots in each playback time segment into a target image.

Optionally, in this embodiment, the playback time segments, the playback time points, and the images that have a correspondence may be recorded in a form of generating an index file.

In an optional solution, the splicing the plurality of images into a target image includes:

S1: transforming the plurality of images into a plurality of images with a target size;

S2: arranging the plurality of images with the target size into an image matrix with a target quantity of rows and columns according to an arrangement rule; and S3: splicing the image matrix into the target image.

Optionally, in this embodiment, to facilitate image splicing, the server may transform sizes of the images into the same target size, then arrange the transformed images according to the preset arrangement rule, and splice an image matrix obtained after the arrangement into the target image.

Optionally, in this embodiment, the arrangement rule of the screenshot images in the target image may include, but not limited to: arranging in rows, arranging in columns, arranging in a preset sequence, and the like.

For brief description, the foregoing method embodiments are represented as a series of action combinations. However, a person skilled in the art shall appreciate that this application is not limited to the described order of the actions, because according to this application, some steps may be performed in other orders or simultaneously. In addition, a person skilled in the art shall also know that all the embodiments described in the specification are exemplary embodiments, and the related actions and modules are not necessarily mandatory to this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions of this application essentially or the part contributing to the existing technology may be implemented in a form of a software product. The computer software product is stored in a storage medium (such as a read-only medium (ROM)/a random access memory (RAM), a magnetic disk or an optical disc) and includes several instructions for instructing a terminal device (which may be a mobile phone, a computer, a server, a network device, or the like) to perform the methods described in the embodiments of this application.

Figure 14:
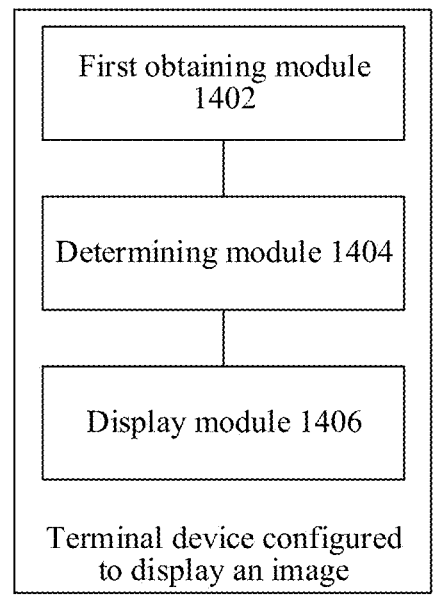
FIG. 14 is a schematic diagram of an optional image display apparatus according to an embodiment of this application.

According to another aspect of the embodiments of this application, a terminal device configured to perform the foregoing image display method is further provided. As shown in FIG. 14, the apparatus includes:

1) a first obtaining module 1402, configured to obtain, in response to detecting that a target operation is performed on a playback progress bar of a multimedia resource, a target playback time point corresponding to a target operation position on which the target operation is performed on the playback progress bar in the multimedia resource;

2) a determining module 1404, configured to determine a target region corresponding to the target playback time point in a target image, the target image including a plurality of regions, the plurality of regions having a correspondence with a plurality of playback time points of the multimedia resource, the plurality of regions including the target region, and the plurality of playback time points including the target playback time point; and 3) a display module 1406, configured to display an image on the target region.

Optionally, in this embodiment, the image display apparatus may be applied to a hardware environment formed by the client 302 shown in FIG. 3.

Optionally, in this embodiment, the client 302 may include, but not limited to, the client 102 shown in FIG. 1.

Optionally, in this embodiment, the image display apparatus may be applied to, but not limited to, a scenario in which an image is displayed on a client.

Optionally, in this embodiment, the multimedia resource may include, but not limited to, a video resource (such as a video stream or a video file), an audio resource (such as an audio stream or an audio file), a slide file, a dynamic album, a dynamic picture, and the like.

Optionally, in this embodiment, the target operation may include, but not limited to, clicking, stopping, moving, dragging, and the like. Optionally, in this embodiment, the target image is divided into a plurality of regions. Each region corresponds to one or more playback time points of the multimedia resource, and an image on the region is an image needing to be displayed when the target operation is detected at a playback time point corresponding to the region.

Optionally, in this embodiment, the image needing to be displayed may be, but not limited to be, preset for a playback time point, or may be obtained by taking a screenshot for the multimedia resource.

Optionally, in this embodiment, a manner for displaying the image on the target region may be switching a displayed image to the image on the target region on the display interface of the multimedia resource, or may be displaying in a specified region on the display interface.

It may be seen that by using the foregoing apparatus, when the target operation performed on the playback progress bar of the multimedia resource is detected, the target region corresponding to the target playback time point in the target image is determined according to the target playback time point corresponding to the target operation position, and the image in the target region is displayed, so that one target image can correspond to image display at a plurality of playback time points in the multimedia resource, so as to avoid a need to obtain an image at each playback time point, and reduce a quantity of inputs/outputs between the client and the server, thereby improving image display efficiency, and further achieving the technical effect of resolving the technical problem of a relatively low image display efficiency in related art.

In an optional solution, the determining module includes:

1) a first obtaining unit, configured to obtain the target image and the playback time points and the regions that have the correspondence and correspond to the target image, images on all the plurality of regions being screenshot images of the multimedia resource at playback time points respectively corresponding to the regions; and 2) a second obtaining unit, configured to obtain the target region corresponding to the target playback time point from the playback time points and the regions that have the correspondence.

Optionally, in this embodiment, an image on each of the plurality of regions may be, but not limited to, a screenshot image in the multimedia resource at a playback time point corresponding to the region. While a screenshot is being taken, a correspondence between a playback time point of the image obtained by taking the screenshot and a region of the image obtained by taking the screenshot in the target image may be recorded, and the target image and the correspondence are obtained, so as to determine the target region corresponding to the target playback time point according to the correspondence.

Optionally, in this embodiment, the playback time points and the regions that have a correspondence may be, but not limited to be, stored in a form of an index file.

In an optional solution, the first obtaining unit includes:

1) a first determining subunit, configured to determine a target time segment into which the target playback time point falls in a plurality of playback time segments, a playback time of the multimedia resource being divided into the plurality of playback time segments, the plurality of playback time segments being in a one-to-one correspondence with a plurality of images, and the plurality of images including the target image; and 2) an obtaining subunit, configured to obtain the target image corresponding to the target time segment in the plurality of images, and the playback time points and the regions that have the correspondence and correspond to the target image.

Optionally, in this embodiment, the playback time of the multimedia resource may be divided into a plurality of playback time segments. Each playback time segment corresponds to one image. An image corresponding to a target playback time segment into which the target playback time point falls may be determined as the target image. During obtaining of the target image, the playback time points and the regions that have the correspondence and correspond to the target image may also be obtained.

Optionally, in this embodiment, all information such as the playback time segments and the images that have a correspondence, and the images, the playback time points, and the regions that have a correspondence may be stored in a form of an index file.

In an optional solution, the second obtaining unit includes:

1) a second determining subunit, configured to determine a target position according to the target playback time point, a start time point of the target image, and a screenshot time interval, the start time point being an earliest time point in the playback time points corresponding to the plurality of regions on the target image, the screenshot time interval being an interval between two adjacent playback time points, and the target position being used for indicating a position of the target playback time point in a playback time segment of the multimedia resource that corresponds to the target image;

2) a third determining subunit, configured to determine a display position of the target region on the target image according to the target position and an arrangement rule of the screenshot images in the target image; and 3) a fourth determining subunit, configured to determine a region with a target size that is on the target image and located on the display position as the target region, the target image being obtained by splicing the screenshot images with the target size, and the screenshot images being arranged on the target image according to the arrangement rule.

Optionally, in this embodiment, the target region corresponding to the target playback time point may be determined according to, but not limited to, information such the target playback time point, the start time point of the target image, the screenshot time interval, the arrangement rule of the screenshot images in the target image, and the target size of the target region.

Optionally, in this embodiment, the arrangement rule of the screenshot images in the target image may include, but not limited to: arranging in rows, arranging in columns, arranging in a preset sequence, and the like.

In an optional solution, the second determining subunit is configured to: determine a difference between the target playback time point and the start time point of the target image; and determine a ratio of the difference to the screenshot time interval as the target position.

A manner for determining the target region when the images of the plurality of regions in the target image are arranged in columns is similar to this manner. Details are not described herein again.

In an optional solution, the display module includes:

1) a switching unit, configured to switch a playback interface of the multimedia resource to playing the image on the target region; or 2) a display unit, configured to display the image on the target region on a predetermined interface in the playback interface of the multimedia resource.

Optionally, in this embodiment, the display position of the image on the target region may include, but not limited to, the playback interface of the multimedia resource, the predetermined interface on the playback interface of the multimedia resource, or the like.

Optionally, in this embodiment, the predetermined interface on the playback interface of the multimedia resource may be located at a position above the target operation position, or may be located at a position surrounding the playback interface. A size of the predetermined interface may be configured.

In an optional solution, the apparatus further includes:

1) a screenshot taking module, configured to take screenshots of images of the multimedia resource at the plurality of playback time points, to obtain a plurality of screenshot images having a correspondence with the plurality of playback time points;

2) a first splicing module, configured to splice the plurality of screenshot images into the target image, a region at which each of the plurality of screenshot images is located on the target image being one of the plurality of regions; and 3) a storage module, configured to store the target image and record a correspondence between the plurality of playback time points and the plurality of regions.

Optionally, in this embodiment, the foregoing process may be performed, but not limited to, on a server side. The server takes screenshots for the multimedia resource, and splices and stores the screenshot images. The client obtains the target image and information of the target image through an interaction with the server.

Figure 15:
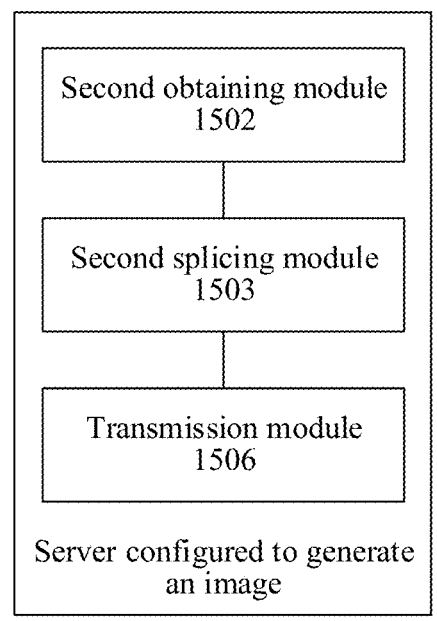
FIG. 15 is a schematic diagram of another optional image display apparatus according to an embodiment of this application.

According to another aspect of the embodiments of this application, another server configured to perform the foregoing image generation method is further provided. As shown in FIG. 15, the apparatus includes:

1) a second obtaining module 1502, configured to obtain playback time points on a multimedia resource and to-be-displayed images that have a correspondence, the playback time points on the multimedia resource including a plurality of playback time points, and the to-be-displayed images including a plurality of images;

2) a second splicing module 1504, configured to splice the plurality of images into a target image, a region at which each of the plurality of images is located on the target image being one of a plurality of regions included in the target image; and 3) a transmission module 1506, configured to transmit the target image and the plurality of playback time points and the plurality of regions that have a correspondence to a client playing the multimedia resource, the target image being used for instructing the client to: obtain, in response to detecting that a target operation is performed on a playback progress bar of the multimedia resource, a target playback time point corresponding to a target operation position on which the target operation is performed on the playback progress bar in the multimedia resource; determine a target region corresponding to the target playback time point in the target image; and display an image on the target region.

Optionally, in this embodiment, the image display apparatus may be applied to, but not limited to, the server corresponding to the client.

Optionally, in this embodiment, the image display apparatus may be applied to a hardware environment formed by a server 1002 shown in FIG. 10. Optionally, in this embodiment, the multimedia resource may include, but not limited to, a video resource (such as a video stream or a video file), an audio resource (such as an audio stream or an audio file), a slide file, a dynamic album, a dynamic picture, and the like.

Optionally, in this embodiment, the target operation may include, but not limited to, clicking, stopping, moving, dragging, and the like. For example, a user controls a mouse pointer to move up and down at a position on the playback progress bar. The moving operation may be determined as the target operation, and an intersection between a moving path during the moving process and the playback progress bar is determined as the target operation position of the target operation. Alternatively, for another example, a user controls a mouse pointer to stop at a position on the playback progress bar. When it is detected that a stopping time reaches a preset time (for example, 2 seconds), it is determined that a target operation performed on the playback progress bar of the multimedia resource is detected, and the position at which the mouse pointer is stopped is determined as the target operation position of the target operation.

Optionally, in this embodiment, the target image is divided into a plurality of regions. Each region corresponds to one or more playback time points of the multimedia resource, and an image on the region is an image needing to be displayed when the target operation is detected at a playback time point corresponding to the region.

Optionally, in this embodiment, the image needing to be displayed may be, but not limited to, preset for a playback time point, or may be obtained by taking a screenshot for the multimedia resource.

It may be seen that by using the foregoing apparatus, the playback time points on the multimedia resource and the to-be-displayed images that have the correspondence are obtained, the plurality of images are spliced into the target image, and the target image and the playback time points and the regions that have the correspondence are transmitted to the client. When detecting the target operation performed on the playback progress bar of the multimedia resource, the client determines the target region corresponding to the target playback time point in the target image according to the target playback time point corresponding to the target operation position, and displays the image in the target region, so that one target image can correspond to image display at a plurality of playback time points in the multimedia resource, so as to avoid a need to obtain an image at each playback time point, and reduce a quantity of inputs/outputs between the client and the server, thereby achieving the technical effect of improving image display efficiency, and further resolving the technical problem of a relatively low image display efficiency in related art.

In an optional solution, the obtaining module includes:

1) a screenshot taking unit, configured to take screenshots of images of the multimedia resource at the plurality of playback time points, to obtain the plurality of images having the correspondence with the plurality of playback time points; or 2) a receiving unit, configured to receive the plurality of images and the correspondence between the plurality of images and the plurality of playback time points.

Optionally, in this embodiment, the to-be-displayed images may be obtained by taking screenshots for the multimedia resource, or may be preconfigured.

In an optional solution, the multimedia resource includes a multimedia data stream, where the screenshot taking unit includes:

1) a first screenshot taking subunit, configured to take screenshots for the multimedia data stream according to a first time interval from a time point of starting obtaining the multimedia data stream, and record playback time points that correspond to images obtained by taking screenshots and that are in the multimedia data stream;

2) a fifth determining subunit, configured to determine images that are obtained by taking screenshots within a current playback time segment at an interval of a target playback time length as the plurality of images corresponding to the current playback time segment, and determine playback time points of the plurality of images corresponding to the current playback time segment as the plurality of playback time points; and 3) a first recording subunit, configured to record playback time segments, playback time points, and images that have a correspondence.

Optionally, in this embodiment, the multimedia resource may include a multimedia data stream (such as a video stream, an audio stream, or a picture stream). For the multimedia data stream, screenshots may be taken according to the first time interval, and images obtained by taking screenshots within the current playback time segment are spliced at an interval of the target playback time length, to obtain a target image.

Optionally, in this embodiment, the playback time segments, the playback time points, and the images that have a correspondence may be recorded in a form of generating an index file.

Optionally, in this implementation, the server transmits the spliced target image and the index file to the client, so that the client may display a corresponding thumbnail according to the detected target operation and information provided in the index file.

In an optional solution, the multimedia resource includes a multimedia file, where the screenshot taking unit includes:

1) a division subunit, configured to divide a playback time of the multimedia file into a plurality of playback time segments;

2) a second screenshot taking subunit, configured to take screenshots for a multimedia resource, in the multimedia file, corresponding to each of the plurality of playback time segments according to a second time interval, to obtain the plurality of images corresponding to the playback time segment and the playback time points having the correspondence with the plurality of images; and 3) a second recording subunit, configured to record playback time segments, playback time points, and images that have a correspondence.

Optionally, in this embodiment, the multimedia resource includes a multimedia file (such as a video file, an audio file, a dynamic album, or a slide file). The server may divide the playback time of the multimedia resource into a plurality of playback time segments, take screenshots for the multimedia resource at each playback time segment according to the second time interval, and splice images obtained by taking screenshots in each playback time segment into a target image.

Optionally, in this embodiment, the playback time segments, the playback time points, and the images that have a correspondence may be recorded in a form of generating an index file.

In an optional solution, the second splicing module includes:

1) a transformation unit, configured to transform the plurality of images into a plurality of images with a target size;

2) an arrangement unit, configured to arrange the plurality of images with the target size into an image matrix with a target quantity of rows and columns according to an arrangement rule; and 3) a splicing unit, configured to splice the image matrix into the target image.

Optionally, in this embodiment, to facilitate image splicing, the server may transform sizes of the images into the same target size, then arrange the transformed images according to the preset arrangement rule, and splice an image matrix obtained after the arrangement into the target image.

Optionally, in this embodiment, the arrangement rule of the screenshot images in the target image may include, but not limited to: arranging in rows, arranging in columns, arranging in a preset sequence, and the like.

For an application environment of this embodiment of this application, reference may be made, but not limited to, the application environment of the foregoing embodiment. This is not described again in detail in this embodiment. This embodiment of this application provides an optional and specific application example for performing the foregoing image display method.

Figure 16:
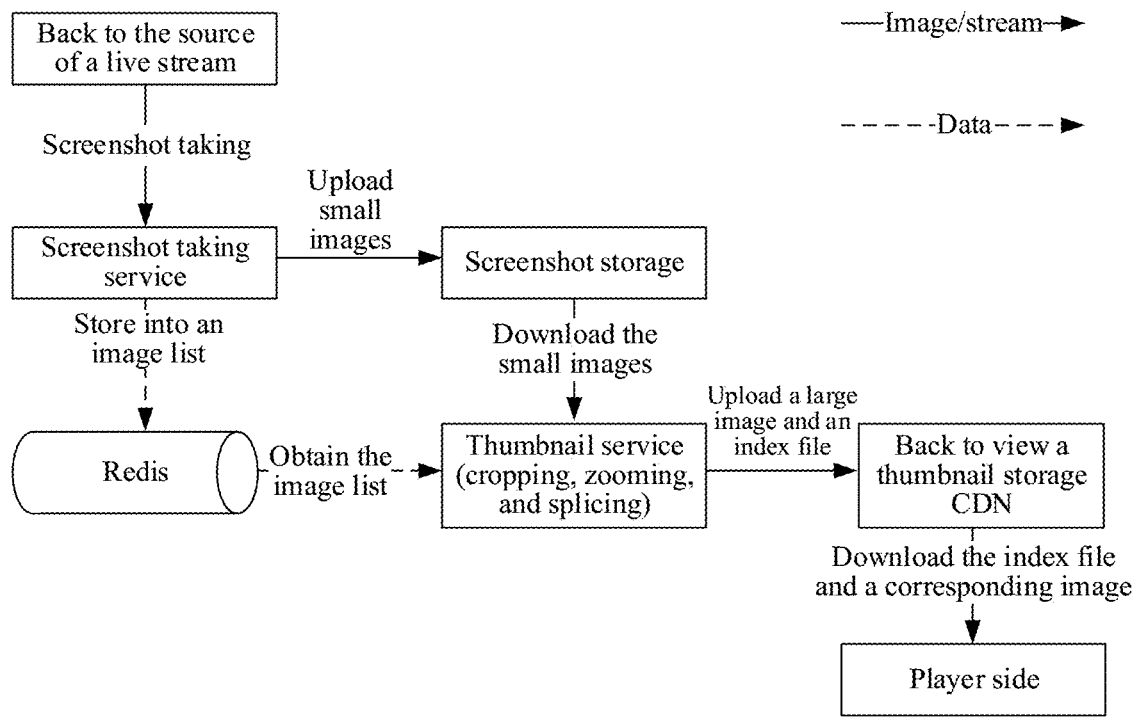
FIG. 16 is a schematic diagram 1 of an application scenario of an optional image display method according to an embodiment of this application.

In an optional embodiment, the image display method may be applied to, but not limited to, a scenario displayed by thumbnails of a video live stream shown in FIG. 16. In this scenario, the thumbnail is an image with a specified relatively small size that is obtained after cropping and zooming a raw image. Live streaming screenshot taking means taking a screenshot of an image of a current picture from the live stream. Live streaming back-watching means sliding a progress bar during the live streaming to view content that has been on-live before a current time point. The large image in the following refers to the target image, and the small image refers to a region in the target image.

With continuous improvement of network environments, the Internet has gone deep into every aspect of people's life. Video products such as conventional video-on-demand and real-time live streaming can provide better audio-visual experience, and therefore are appreciated by the public. In this scenario, a combination of a front end and a rear end is used to provide a more effective manner for displaying a thumbnail on a playback progress bar of a client, to further improve interactive experience of a user.

In this scenario, real-time screenshots are first taken for the live stream; raw images obtained by taking screenshots are cropped and zoomed; the zoomed images are arranged and spliced into a large image according to timestamps, small images being arranged in a matrix form in the spliced large image; and then the large image is uploaded to an image storage machine. On a live streaming client (such as a web or an app), when a mouse of the user is hovered over a back-watching progress bar (which refers to a part that has been played on the playback progress bar), the client only needs to download one image, obtains a position of a thumbnail of a current timestamp in the large image according to the timestamp and a size of the image, and make an offset on the large image during displaying according to the position at which the thumbnail is located and a size of the thumbnail, so that the thumbnail of the current time point can be displayed. Thumbnails of a plurality of time points may be displayed on one image, thereby reducing network interactions between the client and the server, and improving image display efficiency and visual experience of the user.

Optionally, the foregoing manner may be applied to a scenario in which a thumbnail of a current video is replayed and displayed during live streaming, or may be applied to a scenario in which a video content thumbnail of a frame corresponding to a current timestamp is displayed on a progress bar in an on-demand video of the user.

Optionally, in this embodiment, a plurality of thumbnails are compressed on one image. During displaying, only one image needs to be downloaded within a period of time. That is, no more images are downloaded within a particular time range. In this way, a thumbnail may be loaded and displayed in a more real-time manner, and a quantity of times for downloading images by interacting with the server is also reduced, thereby saving bandwidths of the server. The client may pre-download the large image and caches the large image locally, and then read a local file according to a need, so that the image may be rapidly displayed. The client may obtain a downloading list of large images according to an index file, and does not need to temporarily request for an image address list from the server for a plurality of times, thereby also reducing interactions between the front end and the rear end.

Optionally, during live streaming, the live streaming content is cached to the server in real time, to provide a real-time back-watching function. The user may view back-watching when encountering a highlight during watching the live streaming. A mouse is hovered over a back-watching progress bar, and a player displays a thumbnail of video content at a time point specified by the mouse, making it convenient for the user to accurately locate the highlight.

In an optional implementation, as shown in FIG. 16, a display process of thumbnails of the live stream includes the following procedures:

First, raw images are generated: taking screenshots of the raw images to obtain small raw images; uploading the images to a storage service; and recording a list of all the screenshots in redis. Subsequently, the small images are spliced into a large image, and an index file is generated: reading a list of the small images and corresponding timestamps from the redis by using a thumbnail generation service; downloading the small images from a screenshot storage service according to the list; splicing the small images into a large image according to M*N (for example, 5*5: 5 rows and 5 columns), and uploading the large image to an image storage service; at the same time, generating an index file of the images that have just been obtained through splicing, to record information such as a quantity of the current large images and information of the small images in the large images; and uploading the index file to the image storage service. Finally, the thumbnails are displayed on the playback progress bar: a player side downloads the index file according to a current timestamp, a current stream id, and an index file url of splicing timestamps during playback, then parses the large images in the index file, calculates a url falling onto a large image according to a current time point, and downloads the large image; calculates a position of a current small image corresponding to the current time point in the large image; and finally partially presents the large image on the front end according to a position of the currently required small image in the large image and a size of the small image, that is, only displaying an image on the part of the small image in the large image.

Optionally, the index file includes information of a plurality of large images, and a plurality of small images may be displayed in each large image. A plurality of small images may be displayed by downloading a large image once, thereby reducing a quantity of times of downloading. The client may pre-download an image to a local cache according to the index file, thereby improving display efficiency.

Figure 17:
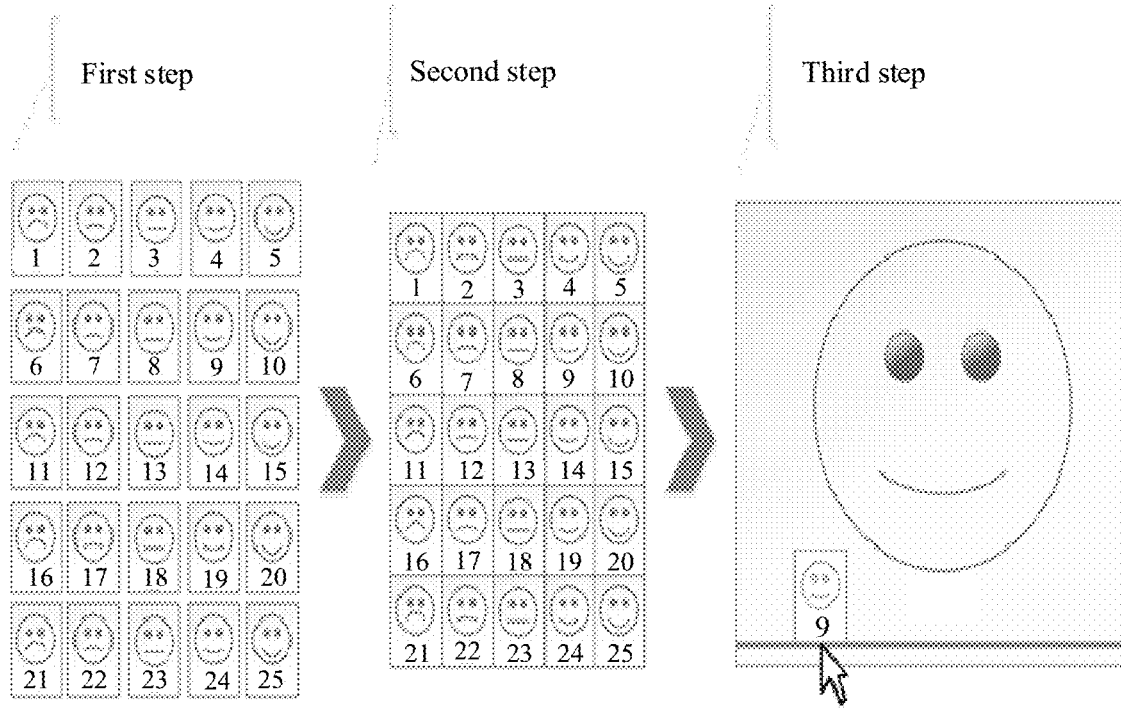
FIG. 17 is a schematic diagram 2 of an application scenario of an optional image display method according to an embodiment of this application.

Optionally, as shown in FIG. 17, a specific solution is divided into three stages as follows:

First stage: As shown in the "first step" in FIG. 17, raw images are periodically obtained by taking screenshots from a live stream by using a screenshot taking service, and are cropped and zoomed into a required small image size. The images are uploaded to an image storage service, and timestamps of the images are stored into sidPicTimetampList<timestamp> of a redis list by using a stream ID (sid) as a key. Timestamps of all the screenshots of sid are recorded.

Second stage: As shown in the "second step" in FIG. 17, a list of a current stream is read from redis by using a thumbnail service, and for each stream, the following processing is performed: reading a screenshot list of the stream, for example, reading a screenshot list within an hour, from the redis; downloading images corresponding to the stream by using an image service; splicing the images into a large image in an m*n form; and generating a thumbnail index file of the current stream. As shown in FIG. 17, 25 small images are combined into a large image in 5 rows and 5 columns, and an index file is generated.

Third stage: As shown in the "third step" in FIG. 17, a (pc/app/web) player of a customer splices a downloading url of the index file according to the current time point (time format: YYYYMMDDHH) based on an agreed rule, downloads the index file and then parses the file, finds large image information corresponding to the current time point according to the current time point, subsequently splices the downloading url of the large image according to a large image url rule, and downloads the large image; obtains an image position required by a thumbnail at the current time point according to index information, a timestamp of a first image in the large image, and a quantity of small images in the large images, and then calculates a position of the current small image in the large image according to a quantity of rows and a quantity of columns of the images in the index, and a size including a width and a height of the small image. The client imposes a limitation on an offset, a width, and a height of the large image, and only displays a partial image of the large image, that is, the currently required small image.

For example, it is assumed that there are s small images in one large image, the large image is obtained through splicing of m rows and n columns, each small image has a width w and a height h, and counting starts from 0. Then, an index position i of the small image is: (a current time–a time point of the first image in the large image)/a screenshot taking interval. A row ai at which the small image is located is i/n, and a column aj at which the small image is located is i%m−1. In this case, coordinates of the small image in the large image is: a coordinate x of the small image=aj*w, and a coordinate y of the small image=ai*h. A region of the small image may be obtained by combining the coordinates (x, y) of the small image with the width and the height (w, h), and may be displayed on the client.

Figure 18:
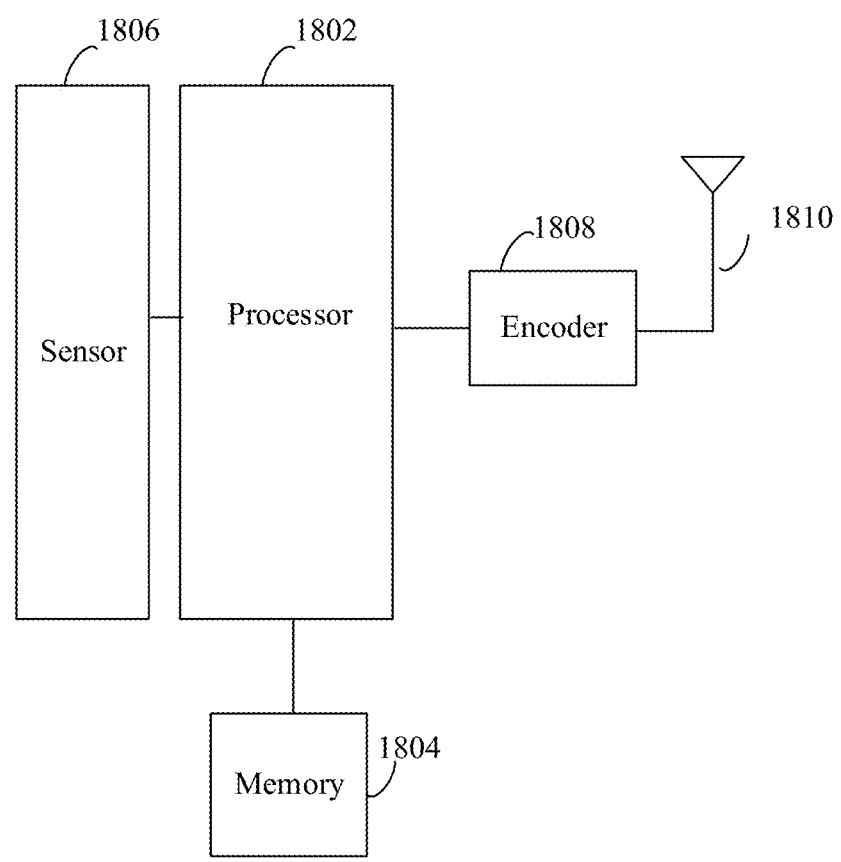
FIG. 18 is a schematic diagram of an optional electronic device according to an embodiment of this application.

According to still another aspect of the embodiments of this application, an electronic device configured to perform the foregoing image display and generation is further provided. As shown in FIG. 18, the electronic device includes: one or more (only one is shown in the figure) processors 1802, a memory 1804, a sensor 1806, an encoder 1808, and a transmission apparatus 1810, the memory storing a computer program, and the processor being configured to perform, through the computer program, the steps in any one of the foregoing method embodiments.

Optionally, in this embodiment, the electronic device may be located in at least one of a plurality of network devices in a computer network.

Optionally, in this embodiment, the processor may be configured to perform, through the computer program, the following steps:

S1: Obtain, in response to detecting that a target operation is performed on a playback progress bar of a multimedia resource, a target playback time point corresponding to a target operation position on which the target operation is performed on the playback progress bar in the multimedia resource.

S2: Determine a target region corresponding to the target playback time point in a target image, the target image including a plurality of regions, the plurality of regions having a correspondence with a plurality of playback time points of the multimedia resource, the plurality of regions including the target region, and the plurality of playback time points including the target playback time point.

S3: Display an image on the target region.

Optionally, in this embodiment, the processor may further be configured to perform, through the computer program, the following steps:

S1: Obtain playback time points on a multimedia resource and to-be-displayed images that have a correspondence, the playback time points on the multimedia resource including a plurality of playback time points, and the to-be-displayed images including a plurality of images.

S2: Splice the plurality of images into a target image, a region at which each of the plurality of images is located on the target image being one of a plurality of regions included in the target image.

S3: Transmit the target image and the plurality of playback time points and the plurality of regions that have a correspondence to a client playing the multimedia resource, the target image being used for instructing the client to: obtain, in response to detecting that a target operation is performed on a playback progress bar of the multimedia resource, a target playback time point corresponding to a target operation position on which the target operation is performed on the playback progress bar in the multimedia resource; determine a target region corresponding to the target playback time point in the target image; and display an image on the target region.

Optionally, a person of ordinary skill in the art may understand that, the structure shown in FIG. 18 is only illustrative. The electronic device may be a terminal device such as a smartphone (such as an Android mobile phone or an iOS mobile phone), a tablet computer, a palmtop computer, a mobile Internet device (MID), or a PAD. FIG. 18 does not constitute a limitation on a structure of the foregoing electronic device. For example, the electronic device may further include more or fewer components (such as a network interface and a display apparatus) than those shown in FIG. 18, or has a configuration different from that shown in FIG. 18.

The memory 1802 may be configured to store a software program and module, for example, a program instruction/module corresponding to the image display method and apparatus in the embodiments of this application. The processor 1804 runs the software program and module stored in the memory 1802, to perform various functional application and data processing, that is, implement the foregoing image display method. The memory 1802 may include a high speed random access memory, and may further include a non-volatile memory, for example, one or more magnetic storage apparatuses, a flash memory, or another non-volatile solid-state memory. In some embodiments, the memory 1802 may further include memories remotely disposed relative to the processor 1804, and these remote memories may be connected to the terminal through a network. Examples of the network include but are not limited to, the Internet, an intranet, a local area network, a mobile communications network, and a combination thereof.

The transmission apparatus 1810 is configured to receive or send data through a network. Specific examples of the network include a wired network and a wireless network. In an example, the transmission apparatus 1810 includes a network interface controller (NIC), which may be connected to another network device and router by using a cable, so as to communicate with the Internet or a local area network. In an instance, the transmission apparatus 1810 is a radio frequency (RF) module, and the radio frequency module is configured to communicate with the Internet in a wireless manner.

Specifically, the memory 1802 is configured to store an application.

The embodiments of this application further provides a storage medium. The storage medium stores a computer program, the computer program being configured to perform the steps in any one of the foregoing method embodiments when being run.

Optionally, in this embodiment, the storage medium may be configured to store a computer program used for performing the following steps:

S1: obtaining, in response to detecting that a target operation is performed on a playback progress bar of a multimedia resource, a target playback time point corresponding to a target operation position on which the target operation is performed on the playback progress bar in the multimedia resource;

S2: Determine a target region corresponding to the target playback time point in a target image, the target image including a plurality of regions, the plurality of regions having a correspondence with a plurality of playback time points of the multimedia resource, the plurality of regions including the target region, and the plurality of playback time points including the target playback time point.

S3: Display an image on the target region.

Optionally, in this embodiment, the storage medium may further be configured to store a computer program used for performing the following steps:

S1: Obtain playback time points on a multimedia resource and to-be-displayed images that have a correspondence, the playback time points on the multimedia resource including a plurality of playback time points, and the to-be-displayed images including a plurality of images.

S2: Splice the plurality of images into a target image, a region at which each of the plurality of images is located on the target image being one of a plurality of regions included in the target image.

S3: Transmit the target image and the plurality of playback time points and the plurality of regions that have a correspondence to a client playing the multimedia resource, the target image being used for instructing the client to: obtain, in response to detecting that a target operation is performed on a playback progress bar of the multimedia resource, a target playback time point corresponding to a target operation position on which the target operation is performed on the playback progress bar in the multimedia resource; determine a target region corresponding to the target playback time point in the target image; and display an image on the target region.

Optionally, the storage medium is further configured to store a computer program used for performing the steps included in the methods in the foregoing embodiments, and details are not described again in this embodiment.

Optionally, in this embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash memory, a read-only memory (ROM), a random access memory (RAM), a magnetic disk, an optical disc, or the like.

The sequence numbers of the foregoing embodiments of this application are merely for the convenience of description, and do not imply the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, it is to be understood that the disclosed client may be implemented in another manner. The described apparatus embodiments are merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may make several improvements or refinements without departing from the principle of this application and the improvements or refinements shall fall within the protection scope of this application.

What is claimed is:

1. An image display method, applied to a terminal device having a processor, a display and memory storing a plurality of computer programs to be executed by the processor, the method comprising:
  displaying a graphical user interface, the graphical user interface including a playback progress bar of a multimedia resource;
  obtaining, in response to detecting that a target operation is performed on the playback progress bar of the multimedia resource, a target playback time point at which a target operation is to be performed on the playback progress bar in the multimedia resource;
  downloading an index file based on the target playback time point, the index file containing information indicating a playback time range of at least one target image comprising a plurality of regions, each region having a correspondence with a respective one of a plurality of playback time points of the multimedia resource;
  downloading a target image corresponding to the target playback time point that falls into the playback time range of the target image based on the information in the index file;
  determining, among the plurality of regions of the target image, a target region whose associated playback time point is closest to the target playback time point in the target image based on the information in the index file; and displaying the target region as a preview of the multimedia resource corresponding to the target playback time point on the playback progress bar.

2. The method according to claim 1, wherein the determining a target region corresponding to the target playback time point in a target image comprises:
obtaining the target image and the plurality of playback time points and the plurality of regions corresponding to the plurality of playback time points, portions of the target image corresponding to the plurality of regions being screenshot images of the multimedia resource at the plurality of playback time points respectively; and
obtaining the portion of the target image corresponding to the target region at the target playback time point from the plurality of playback time points and the plurality of regions corresponding to the plurality of playback time points.

3. The method according to claim 2, wherein the obtaining the target image and the plurality of playback time points and the plurality of regions corresponding to the plurality of playback time points comprises:
determining, among a plurality of playback time segments, a target time segment into which the target playback time point falls, a playback time of the multimedia resource being divided into the plurality of playback time segments, the plurality of playback time segments being in a one-to-one correspondence with a plurality of images, and the plurality of images comprising the target image; and
obtaining, from the plurality of images, the target image corresponding to the target time segment, the plurality of playback time points and the plurality of regions corresponding to the plurality of playback time points.

4. The method according to claim 2, wherein the obtaining the portion of the target image corresponding to the target region at the target playback time point from the plurality of playback time points and the plurality of regions corresponding to the plurality of playback time points comprises:
determining a target position according to the target playback time point, a start time point of the target image, and a screenshot time interval, the start time point being an earliest time point in the playback time points corresponding to the plurality of regions on the target image, the screenshot time interval being an interval between two adjacent playback time points, and the target position being used for indicating a position of the target playback time point in a playback time segment of the multimedia resource that corresponds to the target image;
determining a display position of the target region on the target image according to the target position and an arrangement rule of the screenshot images in the target image; and
determining a region with a target size that is on the target image and located on the display position as the target region, the target image being obtained by splicing the screenshot images with the target size, and the screenshot images being arranged on the target image according to the arrangement rule.

5. The method according to claim 4, wherein the determining a target position according to the target playback time point, a start time point of the target image, and a screenshot time interval comprises:
determining a difference between the target playback time point and the start time point of the target image; and
determining a ratio of the difference to the screenshot time interval as the target position.

6. The method according to claim 1, wherein before the determining a target region corresponding to the target playback time point in a target image, the method further comprises:
taking screenshots of images of the multimedia resource at the plurality of playback time points, to obtain a plurality of screenshot images corresponding to the plurality of playback time points;
splicing the plurality of screenshot images into the target image, each screenshot image occupying a respective one of the plurality of regions of the target image according to a corresponding one of the plurality of playback time points; and
storing the target image and recording a correspondence between the plurality of playback time points and the plurality of regions.

7. A terminal device, comprising a memory and a processor, the memory storing a plurality of computer programs, and the processor being configured to execute the plurality of computer programs and perform a plurality of operations including:
displaying a graphical user interface, the graphical user interface including a playback progress bar of a multimedia resource;
obtaining, in response to detecting that a target operation is performed on the playback progress bar of the multimedia resource, a target playback time point at which a target operation is to be performed on the playback progress bar in the multimedia resource;
downloading an index file based on the target playback time point, the index file containing information indicating a playback time range of at least one target image comprising a plurality of regions, each region having a correspondence with a respective one of a plurality of playback time points of the multimedia resource;
downloading a target image corresponding to the target playback time point that falls into the playback time range of the target image based on the information in the index file;
determining, among the plurality of regions of the target image, a target region whose associated playback time point is closest to the target playback time point in the target image based on the information in the index file; and
displaying the target region as a preview of the multimedia resource corresponding to the target playback time point on the playback progress bar.

8. The terminal device according to claim 7, wherein the determining a target region corresponding to the target playback time point in a target image comprises:
obtaining the target image and the plurality of playback time points and the plurality of regions corresponding to the plurality of playback time points, portions of the target image corresponding to the plurality of regions being screenshot images of the multimedia resource at the plurality of playback time points respectively; and
obtaining the portion of the target image corresponding to the target region at the target playback time point from the plurality of playback time points and the plurality of regions corresponding to the plurality of playback time points.

9. The terminal device according to claim 8, wherein the obtaining the target image and the plurality of playback time points and the plurality of regions corresponding to the plurality of playback time points comprises:

determining, among a plurality of playback time segments, a target time segment into which the target playback time point falls, a playback time of the multimedia resource being divided into the plurality of playback time segments, the plurality of playback time segments being in a one-to-one correspondence with a plurality of images, and the plurality of images comprising the target image; and obtaining, from the plurality of images, the target image corresponding to the target time segment, the plurality of playback time points and the plurality of regions corresponding to the plurality of playback time points.

10. The terminal device according to claim 8, wherein the obtaining the portion of the target image corresponding to the target region at the target playback time point from the plurality of playback time points and the plurality of regions corresponding to the plurality of playback time points comprises:

determining a target position according to the target playback time point, a start time point of the target image, and a screenshot time interval, the start time point being an earliest time point in the playback time points corresponding to the plurality of regions on the target image, the screenshot time interval being an interval between two adjacent playback time points, and the target position being used for indicating a position of the target playback time point in a playback time segment of the multimedia resource that corresponds to the target image;

determining a display position of the target region on the target image according to the target position and an arrangement rule of the screenshot images in the target image; and determining a region with a target size that is on the target image and located on the display position as the target region, the target image being obtained by splicing the screenshot images with the target size, and the screenshot images being arranged on the target image according to the arrangement rule.

11. The terminal device according to claim 10, wherein the determining a target position according to the target playback time point, a start time point of the target image, and a screenshot time interval comprises:

determining a difference between the target playback time point and the start time point of the target image; and determining a ratio of the difference to the screenshot time interval as the target position.

12. The terminal device according to claim 7, wherein the plurality of operations further comprise:

before determining the target region corresponding to the target playback time point in the target image:

taking screenshots of images of the multimedia resource at the plurality of playback time points, to obtain a plurality of screenshot images corresponding to the plurality of playback time points;

splicing the plurality of screenshot images into the target image, each screenshot image occupying a respective one of the plurality of regions of the target image according to a corresponding one of the plurality of playback time points; and storing the target image and recording a correspondence between the plurality of playback time points and the plurality of regions.

13. A non-transitory computer-readable storage medium storing a plurality of computer programs that, when executed by a processor of a terminal device, causes the terminal device to perform a plurality of operations including:

displaying a graphical user interface, the graphical user interface including a playback progress bar of a multimedia resource;

obtaining, in response to detecting that a target operation is performed on the playback progress bar of the multimedia resource, a target playback time point at which a target operation is to be performed on the playback progress bar in the multimedia resource;

downloading an index file based on the target playback time point, the index file containing information indicating a playback time range of at least one target image comprising a plurality of regions, each region having a correspondence with a respective one of a plurality of playback time points of the multimedia resource;

downloading a target image corresponding to the target playback time point that falls into the playback time range of the target image based on the information in the index file;

determining, among the plurality of regions of the target image, a target region whose associated playback time point is closest to the target playback time point in the target image based on the information in the index file; and displaying the target region as a preview of the multimedia resource corresponding to the target playback time point on the playback progress bar.

14. The non-transitory computer-readable storage medium according to claim 13, wherein the determining a target region corresponding to the target playback time point in a target image comprises:

obtaining the target image and the plurality of playback time points and the plurality of regions corresponding to the plurality of playback time points, portions of the target image corresponding to the plurality of regions being screenshot images of the multimedia resource at the plurality of playback time points respectively; and obtaining the portion of the target image corresponding to the target region at the target playback time point from the plurality of playback time points and the plurality of regions corresponding to the plurality of playback time points.

15. The non-transitory computer-readable storage medium according to claim 14, wherein the obtaining the target image and the plurality of playback time points and the plurality of regions corresponding to the plurality of playback time points comprises:

determining, among a plurality of playback time segments, a target time segment into which the target playback time point falls, a playback time of the multimedia resource being divided into the plurality of playback time segments, the plurality of playback time segments being in a one-to-one correspondence with a plurality of images, and the plurality of images comprising the target image; and obtaining, from the plurality of images, the target image corresponding to the target time segment, the plurality of playback time points and the plurality of regions corresponding to the plurality of playback time points.

16. The non-transitory computer-readable storage medium according to claim 14, wherein the obtaining the portion of the target image corresponding to the target region at the target playback time point from the plurality of playback time points and the plurality of regions corresponding to the plurality of playback time points comprises:
- determining a target position according to the target playback time point, a start time point of the target image, and a screenshot time interval, the start time point being an earliest time point in the playback time points corresponding to the plurality of regions on the target image, the screenshot time interval being an interval between two adjacent playback time points, and the target position being used for indicating a position of the target playback time point in a playback time segment of the multimedia resource that corresponds to the target image;
- determining a display position of the target region on the target image according to the target position and an arrangement rule of the screenshot images in the target image; and
- determining a region with a target size that is on the target image and located on the display position as the target region, the target image being obtained by splicing the screenshot images with the target size, and the screenshot images being arranged on the target image according to the arrangement rule.

17. The non-transitory computer-readable storage medium according to claim 16, wherein the determining a target position according to the target playback time point, a start time point of the target image, and a screenshot time interval comprises:
- determining a difference between the target playback time point and the start time point of the target image; and
- determining a ratio of the difference to the screenshot time interval as the target position.

18. The non-transitory computer-readable storage medium according to claim 13, wherein the plurality of operations further comprise:
- before determining the target region corresponding to the target playback time point in the target image:
  - taking screenshots of images of the multimedia resource at the plurality of playback time points, to obtain a plurality of screenshot images corresponding to the plurality of playback time points;
  - splicing the plurality of screenshot images into the target image, each screenshot image occupying a respective one of the plurality of regions of the target image according to a corresponding one of the plurality of playback time points; and
  - storing the target image and recording a correspondence between the plurality of playback time points and the plurality of regions.

* * * * *